(12) United States Patent
Alfaro

(10) Patent No.: US 11,597,509 B1
(45) Date of Patent: Mar. 7, 2023

(54) VERTICAL TAKE-OFF AND LANDING AIRCRAFT AND METHODS OF TAKING-OFF, LANDING, AND AIRCRAFT CONTROL

(71) Applicant: Reynaldo Thomas Alfaro, Tehachapi, CA (US)

(72) Inventor: Reynaldo Thomas Alfaro, Tehachapi, CA (US)

( * ) Notice: Subject to any disclaimer, the term of this patent is extended or adjusted under 35 U.S.C. 154(b) by 4 days.

(21) Appl. No.: 17/453,194

(22) Filed: Nov. 2, 2021

Related U.S. Application Data

(60) Provisional application No. 63/109,485, filed on Nov. 4, 2020.

(51) Int. Cl.
| | |
|---|---|
| *B64C 29/00* | (2006.01) |
| *B64C 9/04* | (2006.01) |
| *B64C 39/06* | (2006.01) |

(52) U.S. Cl.
CPC ............ *B64C 29/0025* (2013.01); *B64C 9/04* (2013.01); *B64C 39/068* (2013.01)

(58) Field of Classification Search
CPC ...... B64C 29/0025; B64C 9/04; B64C 39/068
See application file for complete search history.

(56) References Cited

U.S. PATENT DOCUMENTS

| | | | | |
|---|---|---|---|---|
| 4,709,880 A | * | 12/1987 | Bradfield | ............ B64C 29/0066 244/12.5 |
| D763,733 S | | 8/2016 | Topcon | |
| D799,402 S | | 10/2017 | Cummings | |
| D813,143 S | | 3/2018 | Belik | |
| D816,583 S | | 5/2018 | Dutertre | |
| D824,804 S | | 8/2018 | Tian | |
| 10,293,914 B2 | * | 5/2019 | Wiegand | ............ B64C 29/0033 |
| D874,382 S | | 2/2020 | Lilium | |
| 10,597,133 B2 | | 3/2020 | Lilium | |

(Continued)

FOREIGN PATENT DOCUMENTS

CN        114771827 A   *   7/2022

OTHER PUBLICATIONS

Lilium Jet, EVTOL News, Jul. 18, 2020, https://evtol.news/lilium/.

(Continued)

*Primary Examiner* — Brian M O'Hara
(74) *Attorney, Agent, or Firm* — Nemphos Braue LLC; Michael Antone

(57) ABSTRACT

An aircraft that closely integrates thrust and aerodynamics to achieve VTOL flight, forward flight, and smooth transitions from VTOL to forward flight. The invention combines a Box wing, Ducted Rotors and movable Flaperons for VTOL and sustained forward flight of an aircraft. In forward flight, the concept uses a plurality of fixed Ducted Rotors to not only provide thrust, but also enhance dynamic lift and controllability by interacting closely with the two fixed primary lifting bodies of each ducted wing section. In VTOL flight and transitioning to forward flight, the Ducted Rotors direct air through movable Flaperons attached to the trailing end of the ducted wings, providing smooth power, controllability, and aircraft orientation throughout transition. Throughout all phases of flight, differential actuation of Ducted Rotors and Flaperons provide control.

18 Claims, 22 Drawing Sheets

(56) References Cited

U.S. PATENT DOCUMENTS

| | | |
|---|---|---|
| 2016/0023754 A1 | 1/2016 | Lilium |
| 2016/0288903 A1 | 10/2016 | Rothhaar |
| 2016/0311522 A1 | 10/2016 | Lilium |
| 2019/0023390 A1* | 1/2019 | Murrow .......... B64D 29/04 |
| 2019/0217937 A1 | 7/2019 | Lilium |
| 2019/0263515 A1 | 8/2019 | Karem |
| 2020/0085988 A1 | 3/2020 | Vondrell |

OTHER PUBLICATIONS

An introduction to the Lilium Jet, Lilium, May 15, 2019_https://lilium.com/newsroom-detail/youve-never-seen-anything-like-this-an-introduction-to-the-lilium-jet.

* cited by examiner

VERTICAL TAKE-OFF AND LANDING AIRCRAFT AND METHODS OF TAKING-OFF, LANDING, AND AIRCRAFT CONTROL

CROSS-REFERENCE TO RELATED APPLICATIONS

This application claims priority to and the benefit of U.S. Provisional Patent Application No. 63/109,485 filed on Nov. 4, 2020, which is incorporated by reference in its entireties.

STATEMENT REGARDING FEDERALLY SPONSORED RESEARCH OR DEVELOPMENT

Not Applicable

BACKGROUND OF THE INVENTION

Field of the Invention

The disclosed invention relates generally to aircraft, and more particularly to Vertical Take-Off and Landing ("VTOL") aircraft with improved performance for VTOL and forward flight and transitions therebetween.

Background

Historically, aircraft have been divided into two classes: aircraft that provide efficient forward flight, but require runways for take-off and landing, and vertical take-off and landing (VTOL) aircraft, such as helicopters, that do not require runways. Propeller driven or jet aircraft utilize unidirectional thrust for propulsion and wings for lift, which minimizes drag and improves forward flight efficiency. Helicopters offer efficient VTOL but are encumbered by severe drag and low airspeed in forward flight. A small number of shaft-driven tilt-rotor aircraft have demonstrated acceptable performance for a limited number of applications but pay a significant penalty in weight and complexity. In addition, a small number of aircraft with a simpler tilt-wings or a partial tilt-wing mechanism, or electrical power systems utilizing either open propellers or ducted rotors, have shown some improvement in performance in either forward or VTOL flight, but not enough to achieve mission viability. As such, there is a continuing need for aircraft with improved performance in both forward and VTOL flight to achieve mission viability for a broader range of applications.

BRIEF SUMMARY OF THE INVENTION

The present invention addresses the aforementioned shortcomings to provide VTOL aircraft that resolve or avoid the limitations of prior art aircraft. To that end, embodiments of the present invention integrate various combinations of four different technologies to optimize fixed structure and minimize large-scale mechanical component transitions to provide thrust, lift and control throughout all phases of forward and VTOL flight: 1) Fixed box wing 2) Fixed Bi-Wing integrated ducting 3) Fixed position Ducted Rotors and 4) Segmented, movable Flaperons. In various embodiments, combinations of the four inventive features may be employed to provide aircraft that overcome the limitations of the prior art to provide aircraft with improved VTOL capability combined with forward flight efficiency and improved transitions between VTOL and forward flight.

In various embodiments, the aircraft includes a fuselage having a forward and aft direction and including a power system, at least a first right wing and left wing attached to the fuselage. The first left wing is at least substantially symmetrically opposed to the right wing. The first right wing and first left wing including at least one ducted assembly including a fixedly positioned rotor to draw air from the forward direction through the ducted assembly and propel air out of the ducted assembly in the aft direction when powered, the rotor employing power from the power system to rotate. The wings also include a segmented moveable flaperon assembly positioned in the aft direction relative to the rotor to direct propelled air to provide substantially forward thrust and dynamic vertical lift in a first position and substantially vertical thrust and vertical lift in a second position.

The aircraft may include at least one processor to control the rotation of the rotors and the movement of the flaperons to enable flight of the aircraft. The processor may communicate with at least one control device to communicate instructions and data to the aircraft. The control device may be a stand-alone unit or part of a distributed control system operated at one or more locations and communicating with the aircraft via one or more wireless communication technologies. The aircraft and fuselage may be constructed to operate without people onboard or to carry one or more people and may enable at least one of the people onboard the aircraft to control the operation of the aircraft.

In various embodiments, the ducted assemblies may include forward and aft lifting bodies separated by a vertical distance and a forward to aft distance. The forward to aft distance between the lifting bodies may be at least half the vertical distance between the lifting bodies.

The power system for the aircraft may be an electrical power system, in which the rotors are electrically power rotor driven by power from the electrical power system. The electrical power system may include at least one of a battery and may include a hydrocarbon-fueled electric power generator. Alternatively, the rotors may be powered by a hydrocarbon fueled motor.

In various embodiments, the aircraft may include a second right and left wing attached to the fuselage, the second right and left wing being attached elevationally above and aft of the first right and left wing, respectively. The first and second right and left wings having wingtips and being physically connected proximate the wingtips by at least one wingtip longitudinal structure.

The wings including the flaperons may be constructed primarily from at least one of carbon fiber composite material, as well as various types of metals depending upon the application. The aircraft may include one or more types of landing gear, such as landing skids, wheels, etc. to support runway take-off and landing and/or VTOL.

For various applications, the first right and left wings may each include at least three ducted assemblies, but less than twenty ducted assemblies. The rotors may be positioned at a non-zero angle relative to horizontal in the forward-aft direction. For example, the rotors may be positioned at a 45 degree angle relative to horizontal in the forward-aft direction.

In various embodiments, the aircraft may have a fuselage having a forward and aft direction and including an electrical power system. Forward and aft right wings may be attached to the fuselage with the aft right wing being attached elevationally above and aft of the forward right wing. The forward and aft right wings may have wingtips that may be physically connected proximate the wingtips by a longitudinal structure. Forward and aft left wings may be attached to the fuselage with the aft left wing being attached elevationally above and aft of the forward left wing. The forward and aft left wings may have wingtips that may be physically connect proximate the wingtips by a wingtip longitudinal structure.

The wings may include a plurality of ducted assemblies and a segmented moveable flaperon assembly positioned in the aft direction relative to the rotor. The rotors being fixedly positioned electrical rotor to draw air from the forward direction through the ducted assembly and propel air out of the ducted assembly in the aft direction when powered by the electrical power system. The rotors and power system may be sized to enable vertical take-off, forward flight, and vertical landing of the aircraft. The segmented moveable flaperon assembly positioned in the aft direction relative to the rotor to direct propelled air to provide substantially forward thrust and dynamic vertical lift in a first position and substantially vertical thrust and vertical lift in a second position.

Accordingly, the present disclosure addresses the continuing need for aircraft with improved performance in both forward and VTOL flight and transition therebetween and is capable of achieving mission viability for a broader range of applications.

BRIEF DESCRIPTION OF DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
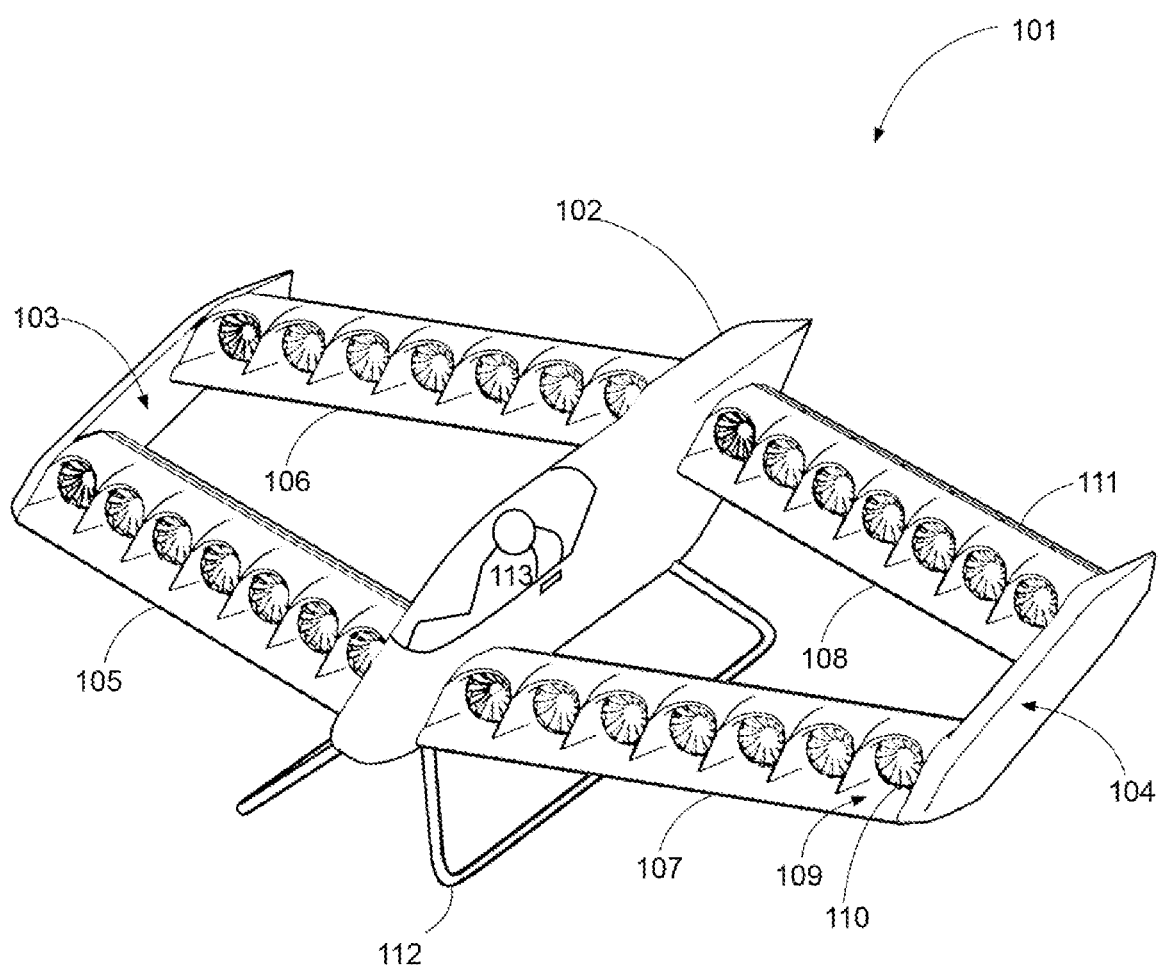
FIG. 1 shows a perspective view of the embodiment example aircraft, as viewed from above, in the front left position.

The terminology used herein is for the purpose of describing particular embodiments only and is not intended to limit the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of items and steps may be disclosed. Each of these may have an individual benefit and each may also be used in conjunction with one or more, or in some cases all, of the other disclosed items. Accordingly, for the sake of clarity, this description will refrain from repeating every possible combination of the individual items in an unnecessary fashion. Nevertheless, the specification and claims should be read with the understanding that such combinations are entirely within the scope of the invention and the claims.

New aircraft propulsion and lift devices and methods for control throughout all phases of flight are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Illustrative embodiments of various embodiments are described below. In the interest of clarity, not all features of an actual implementation are described in this specification. It will of course be appreciated that in the development of any such actual embodiment, numerous specific decisions must be made to achieve the developer's specific goals, such as compliance with system-related and business-related constraints, which will vary from one implementation to another. Moreover, it will be appreciated that such a development effort might be complex and time-consuming but would nevertheless be a routine under-taking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation.

Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The invention and steps will be understood, both as to its structure and operation, from the accompanying description, taken in conjunction with the accompanying drawings. It should be understood that various components, parts, features of the embodiment may be combined together and/or interchanged with one another, all of which are within the scope of the present invention, even though not all variations and embodiments of the invention are shown in the drawings.

It should also be understood that the mixing and matching of features, elements, size and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

FIG. 1 shows various embodiments of an aircraft 101 of the present invention. The aircraft 101 includes a central fuselage 102 that may contain the components of an electrical power-generation and/or storage system, as well as seating and controls for an aircraft configuration occupied by a person. The electrical power generation and storage systems may include but are not restricted to one or many hydrocarbon burning turbines producing electricity; batteries; hydrogen-based fuel-cells; a combination of the listed electrical power generation and storage systems, etc.

The aircraft 101 may include a right-hand (RH) Box Wing Assembly 103 and left-hand (LH) Box Wing Assembly 104. The RH Box Wing Assembly 103 may include a front RH Bi-Wing Ducted Assembly 105 and a back RH Bi-Wing Ducted Assembly 106. The LH Box Wing Assembly 104 may include a front LH Bi-Wing Ducted Assembly 107 and a back LH Bi-Wing Ducted Assembly 108. The Bi-Wing Ducted Assemblies may include at the trailing edge, a segmented Flaperon Assembly 111.

The Bi-Wing Ducted Assemblies 105-107 may include one or more fixed Duct Sections 109, each housing a Rim-driven Ducted Rotor 110. In FIG. 1 embodiments, the Rim-driven Ducted Rotors 110 may be implemented as electrical rim-driven ducted rotors or with different drive mechanisms. While the FIG. 1 embodiment depicts seven Rim-driven Ducted Rotors 110 in the Bi-Wing Ducted Assemblies 105-108, one of ordinary skill will appreciate that the number of Rim-driven Ducted Rotors 110 may be changed to a specific application, such as five. Similarly, while FIG. 1 shows the same number of Rim-driven Ducted Rotors 110 in the four Bi-Wing Ducted Assemblies 105-108, different numbers of Rim-driven Ducted Rotors 110 may be employed.

Various embodiments feature landing skids 112 to minimize weight and complexity of landing gear. Wheeled landing gear may be employed to enable conventional runway take-off and landing. Other devices may be attached to enable landing the aircraft 101.

Figure 2A:
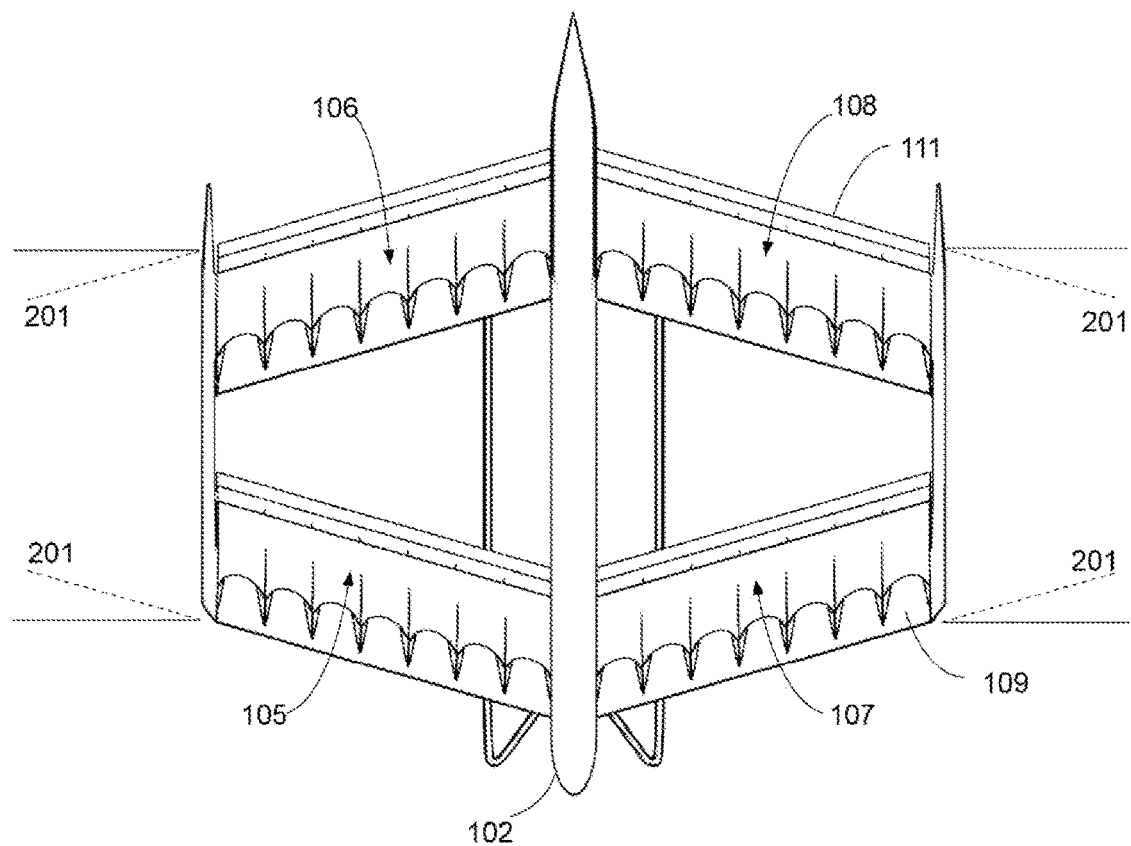
FIG. 2A shows an orthographic view of an aircraft embodiment as viewed from directly above with the front at the bottom of the figure.

FIG. 2A shows an orthographic view of an aircraft 101 embodiment as viewed from directly above with the front at the bottom of the figure. The fixed Duct Sections 109 and Rim-driven Ducted Rotors 110 may be aligned laterally left-to-right along the leading edge, no taper, 16.0 degrees sweep 201 on leading edges.

Figure 2B:
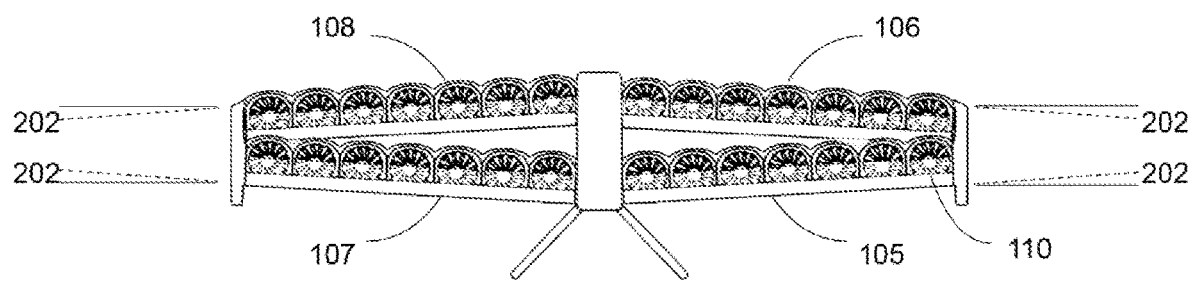
FIG. 2B shows an orthographic view of an aircraft embodiment as viewed from directly in front.

FIG. 2B shows an orthographic view of embodiments of the aircraft 101 as viewed from directly in front. The Bi-Wing Ducted Assemblies may be oriented at 3.0 degrees dihedral on front assemblies 105-107 and 3.0 degrees anhedral on back assemblies 106-108. Other embodiments may include a larger or smaller number of ducts aligned across the span of a Bi-Wing Ducted Assembly 105-108. Other embodiments may also apply different sweep angles or dihedral angles or anhedral angles to achieve different performance goals.

The structure of the Bi-Wing Ducted Assemblies 105-108, may include multiple fixed Duct Sections 109 creating a truss with a span to vertical thickness ratio of approximately 7:1. The purposes of this large ratio, compared to conventional wings with propellers or Rim-driven Ducted Rotors 110 attached to the wing that typically have a ratio greater than 30:1, are that assemblies with the larger ratio: 1) provide a much greater resistance to span-wise bending (especially during VTOL) which would otherwise negatively affect predictable controllability and structural fatigue. 2) provide a more rigid housing for the Rim-driven Ducted Rotor 110, which simplifies the installation and operation of high-performance rotating components. 3) facilitate the installation of simpler Flaperon Assemblies, which do not need to be strengthened or made more complex in order to compensate for span-wise bending moments—transferred from the wing to the flaperon.

Figure 3:
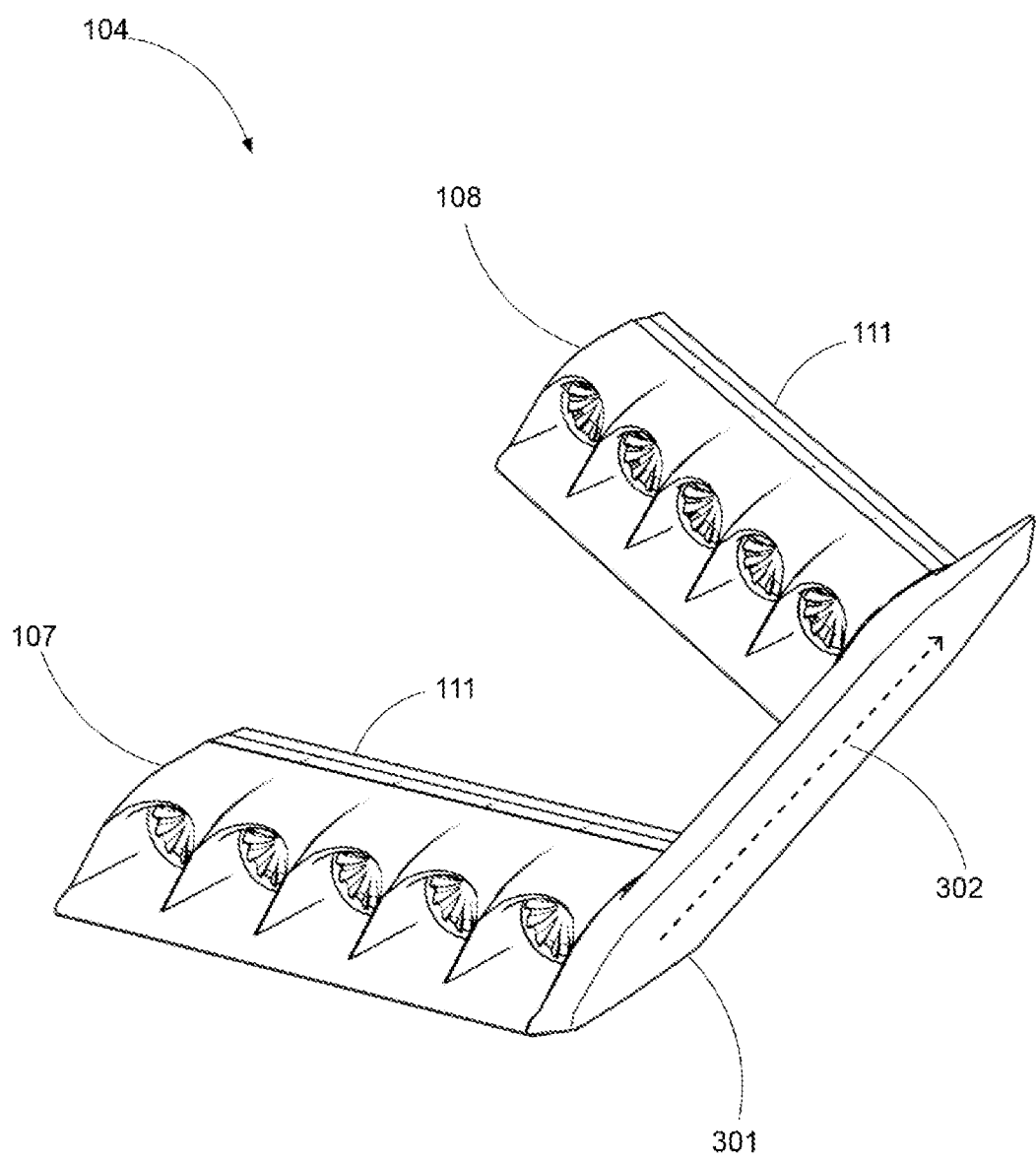
FIG. 3 shows a perspective view as above and in front of a complete LH Box Wing Assembly.
Figure 4:
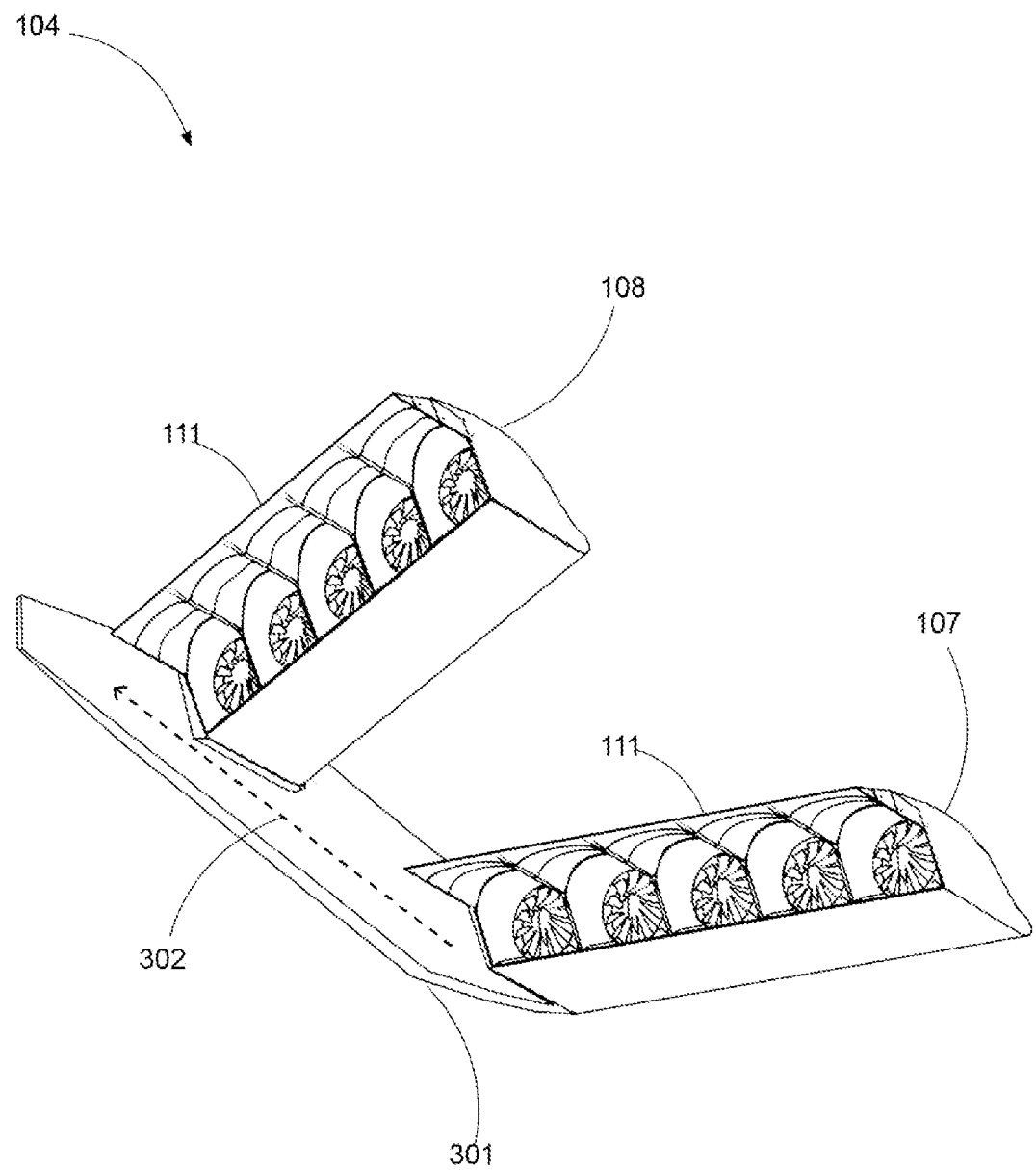
FIG. 4 shows a perspective view as behind and underneath of a complete LH Box Wing Assembly.
Figure 5:
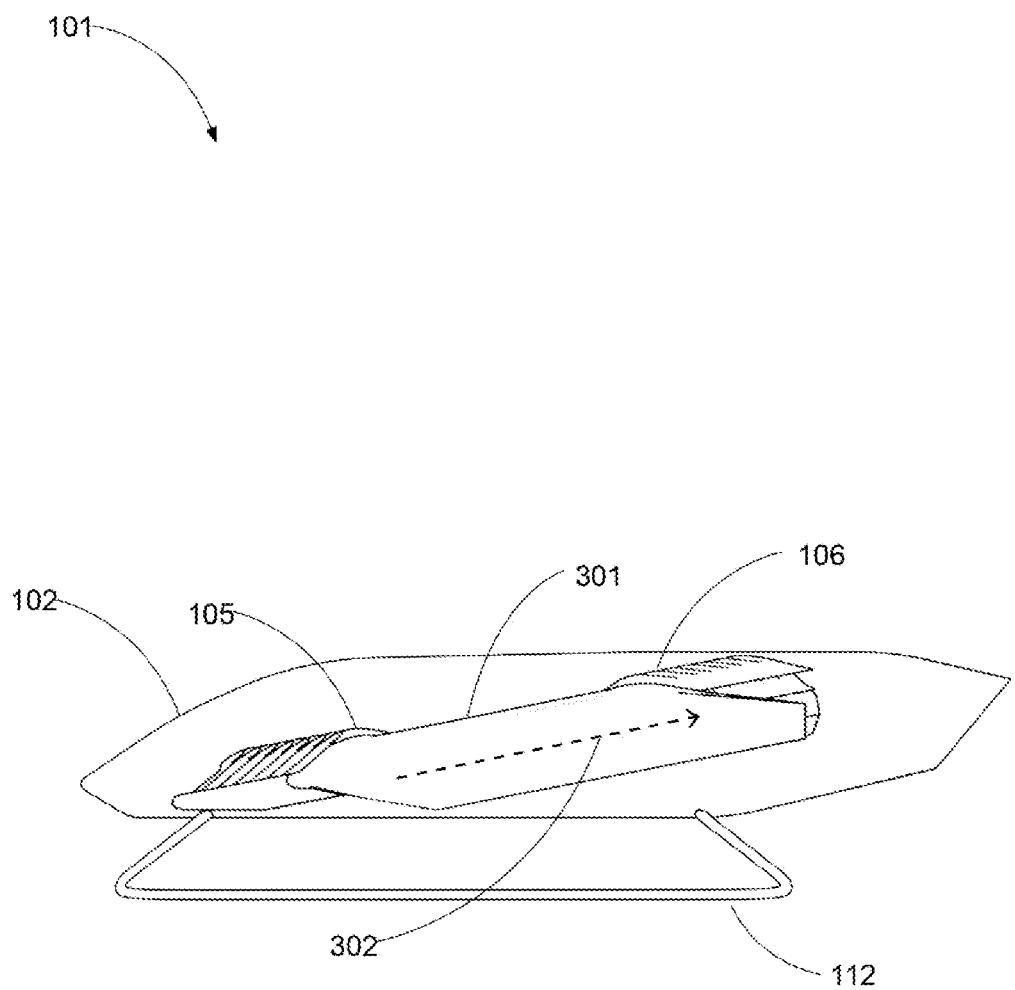
FIG. 5 shows an orthographic view as directly to the left to right of an aircraft embodiment.

FIGS. 3-5 show various views of a complete LH Box Wing Assembly 104. FIG. 3 shows a perspective view as above and in front of a complete LH Box Wing Assembly 104, detached from the aircraft 101. FIG. 4 shows a perspective view as behind and underneath of the complete LH Box Wing Assembly 104 shown in FIG. 3. FIG. 5 shows a left orthographic view of the complete LH Box Wing Assembly 104 attached to the aircraft 101.

The RH/LH Box Wing Assemblies 103/104 may include a Bi-Wing Ducted Assembly 106/108, located above and behind a Bi-Wing Ducted Assembly 105/107, and a single Wingtip Longitudinal structure 301 joining the outboard ends of both Bi-Wing Ducted Assemblies 105/107-106/108. The elevated position of the rear Bi-Wing Ducted Assembly 106/108 decreases the impact of disruptive airflow from Bi-Wing Ducted Assembly 105/107 on the performance of the Rim-driven Ducted Rotors 110 in the assembly 106/108. The Wingtip Longitudinal structure 301 may extend upward and rearward 302 from Bi-Wing Ducted Assembly 105/107 and connect to Bi-Wing Ducted Assembly 106/108 at or proximate the outboard wingtip.

In various embodiments, the Wingtip Longitudinal structure 301 may service several purposes including: 1) joining front and back Bi-Wing Ducted Assemblies 105/107 and 106/108 into a single structure, minimizing independent twisting and bending, which would otherwise reduce predictable controllability and increase structural fatigue; 2) reducing or preventing wingtip vortices that can create drag in forward flight, 3) helping to contain thrust from the outboard Rim-driven Ducted Rotors 110, to beneath the wing, instead of escaping outward from the wing during VTOL flight; 3) helping to protect the Flaperon Assemblies, 111, and outboard Rim-driven Ducted Rotors 110 from damage that may occur when striking objects, such as the ground, trees, structures, or projectiles; 4) providing a secondary path for power and information wiring harnesses to ensure safety of flight.

The trapezoidal shape of the LH Box Wing Assembly 103 may also serve several purposes including: 1) improving the strength and resistance to harmonic bending, compared to a structure with parallel wings; 2) reducing the length and therefore the mass of the Wingtip Longitudinal structure and system components within the longitudinal structure such as wiring harnesses; and 3) reducing wing bending and therefore improving controllability in wind gusts due to weather, close proximity to trees and buildings, etc.

FIG. 5 shows an orthographic view as directly to the left of an aircraft embodiment 101 with the LH Box Wing Assembly 104 installed on the aircraft fuselage 102. The Wingtip Longitudinal structure 301 extends upward and rearward in direction shown by arrow 302 from Bi-Wing Ducted Assembly 105/107 to Bi-Wing Ducted Assembly 106/108.

Figure 6A:
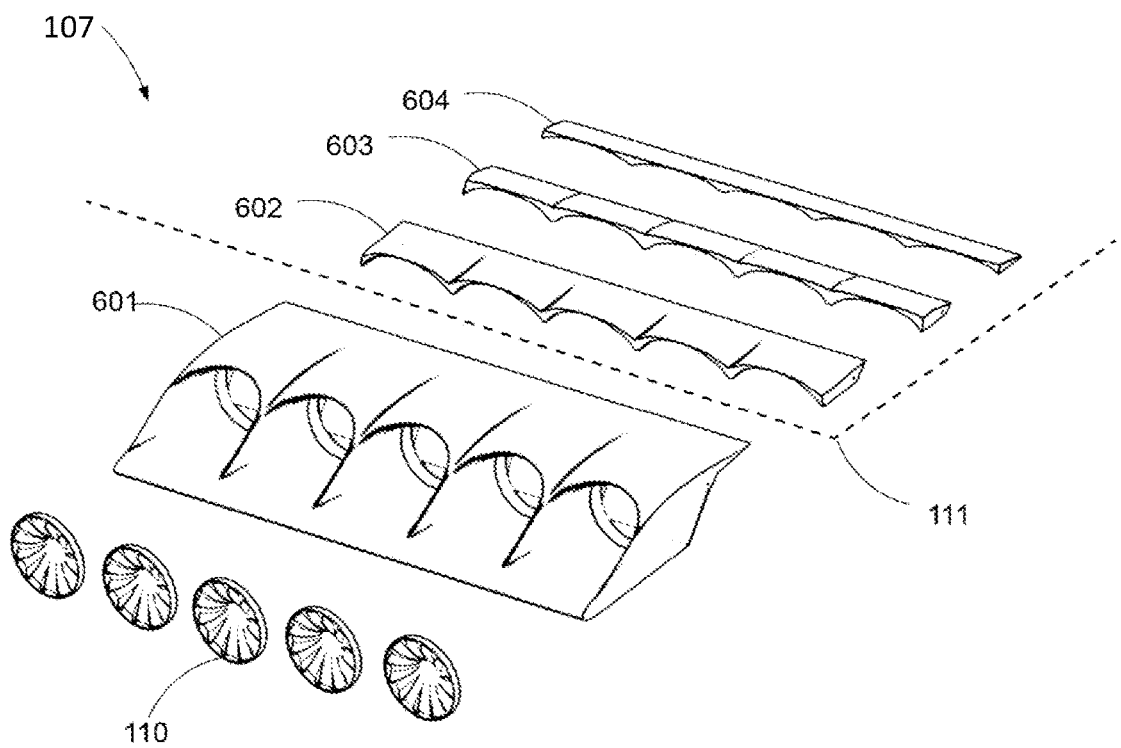
FIG. 6A shows a perspective exploded view as above and in front of a Bi-Wing Ducted Assembly.
Figure 6B:
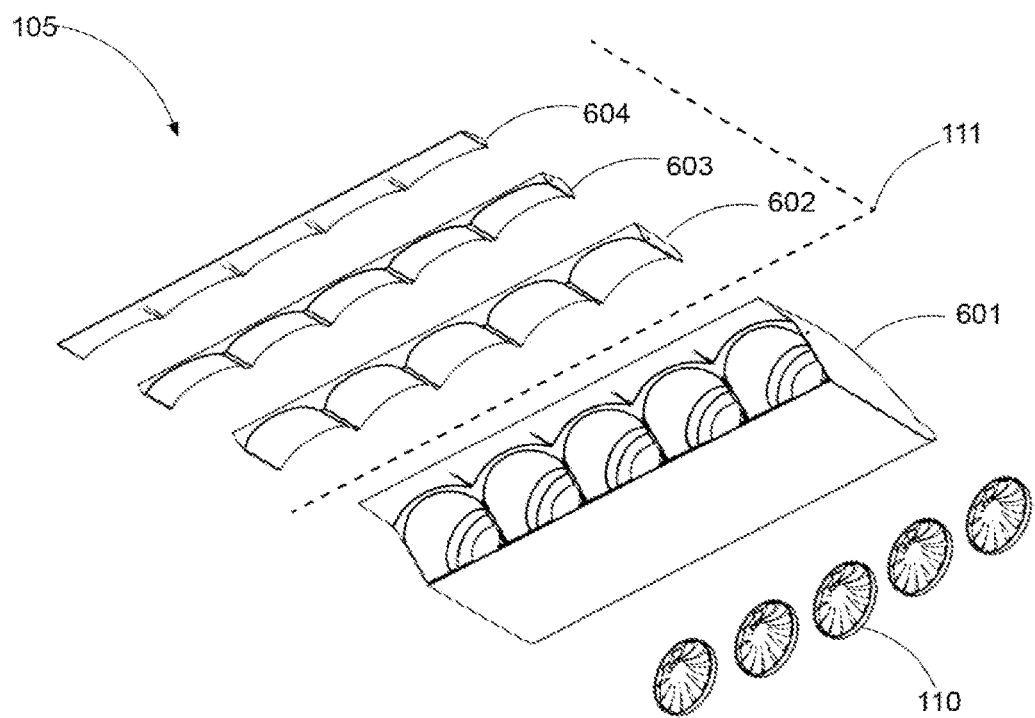
FIG. 6B shows a perspective exploded view as below and behind a Bi-Wing Ducted Assembly.

FIG. 6A shows a single Bi-Wing Ducted Assembly 105-108, disassembled into main components, as viewed from above, in front, and to the left of the aircraft 101. FIG. 6B shows the same single Bi-Wing Ducted Assembly 105-108 embodiment, disassembled into main components, as viewed from below, behind, and to the right of the aircraft 101. In these embodiments, a Flaperon Assembly 111 may be attached to the trailing edge of a Ducted Bi-Wing 601. The Flaperon Assembly may include a forward segment 602, a middle segment 603 and a back segment 604. The Flaperon segments are sequentially attached to each-other with a hinge and actuator device (not shown). While the FIG. 6A embodiment depicts 3 segments, one of ordinary skill will appreciate that other multiples of flaperon segments, or different hinge devices may be utilized in other embodiments.

Figure 7A:
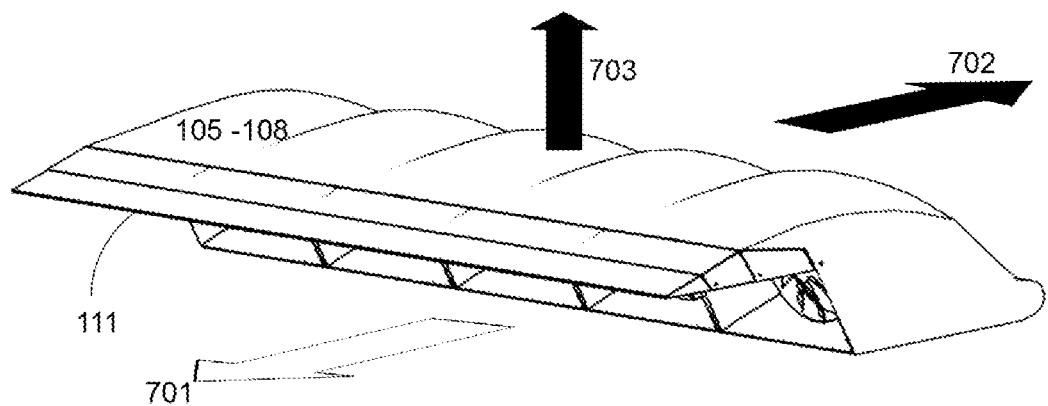
FIG. 7A shows a perspective view as above and behind a single Bi-Wing Ducted Assembly. The Flaperon Assembly is positioned for forward flight.
Figure 7B:
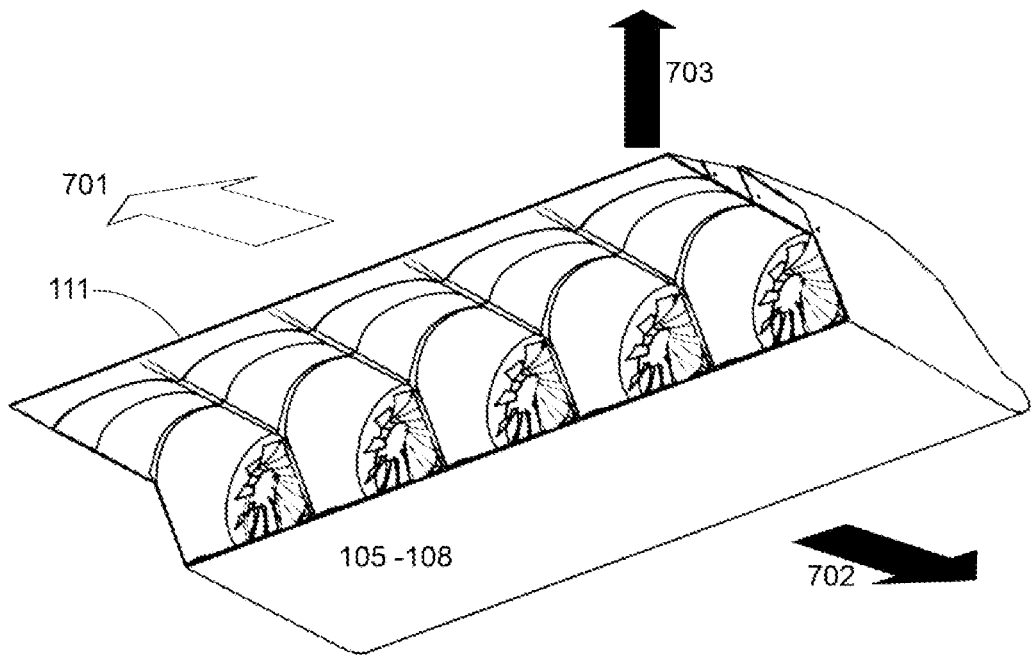
FIG. 7B shows a perspective view as below and behind a single Bi-Wing Ducted Assembly. The Flaperon Assembly is positioned for forward flight.

FIG. 7A and FIG. 7B show perspective views as above and behind, and below and behind, respectively, of a single Bi-Wing Ducted Assembly 105-108 with the Flaperon Assembly 111 straightened to the rear to vector thrust directly back in direction 701 relative to the aircraft 101, to create forward motion in the direction 702 and therefore dynamic aerodynamic lift in the direction 703 for level forward flight.

Figure 8A:
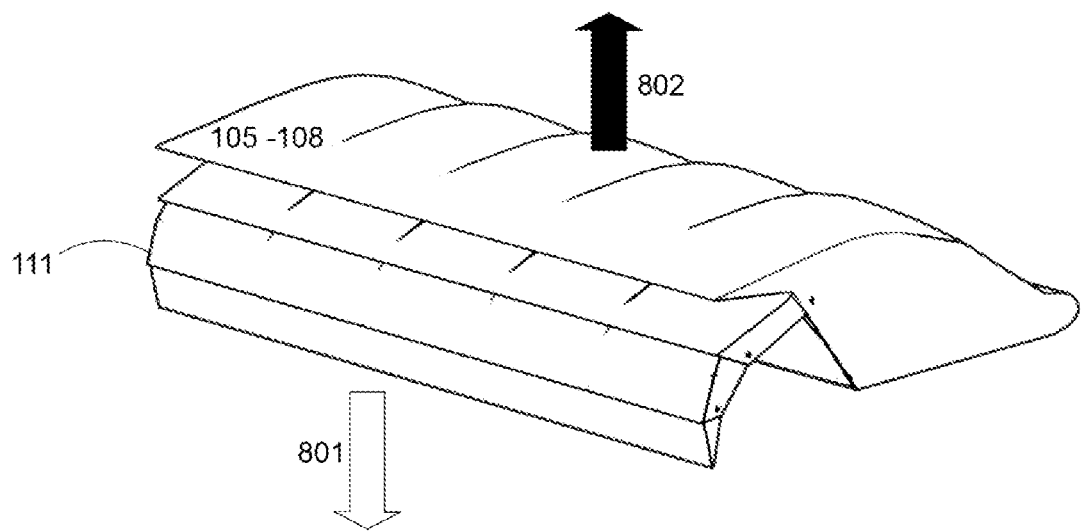
FIG. 8A shows a perspective view as above and behind a single Bi-Wing Ducted Assembly. The Flaperon Assembly is positioned for VTOL flight.
Figure 8B:
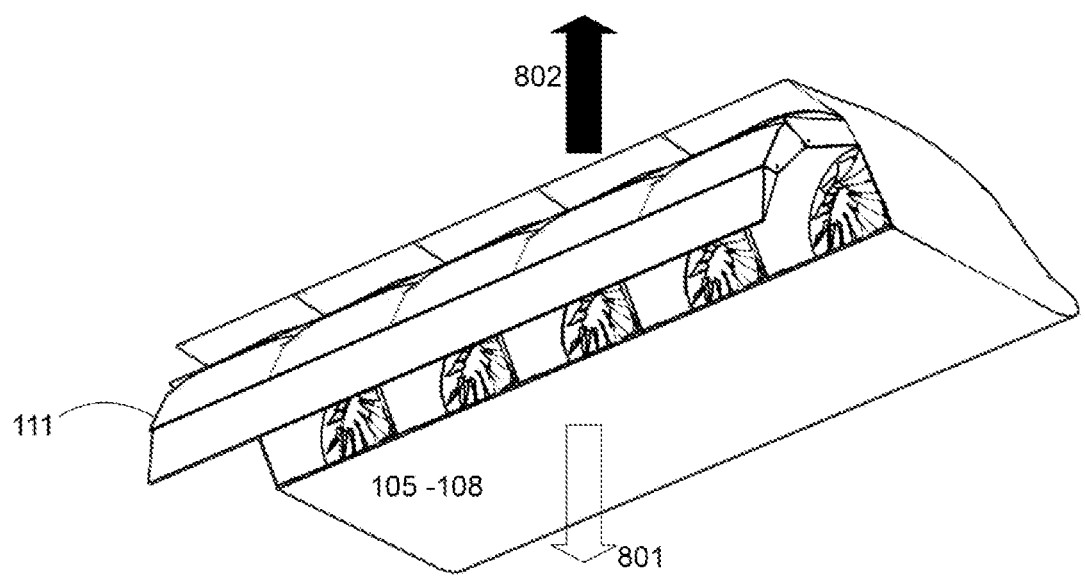
FIG. 8B shows a perspective view as below and behind a single Bi-Wing Ducted Assembly. The Flaperon Assembly is positioned for VTOL flight.

FIG. 8A and FIG. 8B show perspective views as above and behind, and below and behind, respectively, of a single Bi-Wing Ducted Assembly 105-108 with the Flaperon Assembly 111 positioned downward to vector thrust 801 downward to create lift 802 for VTOL flight.

Figure 9:
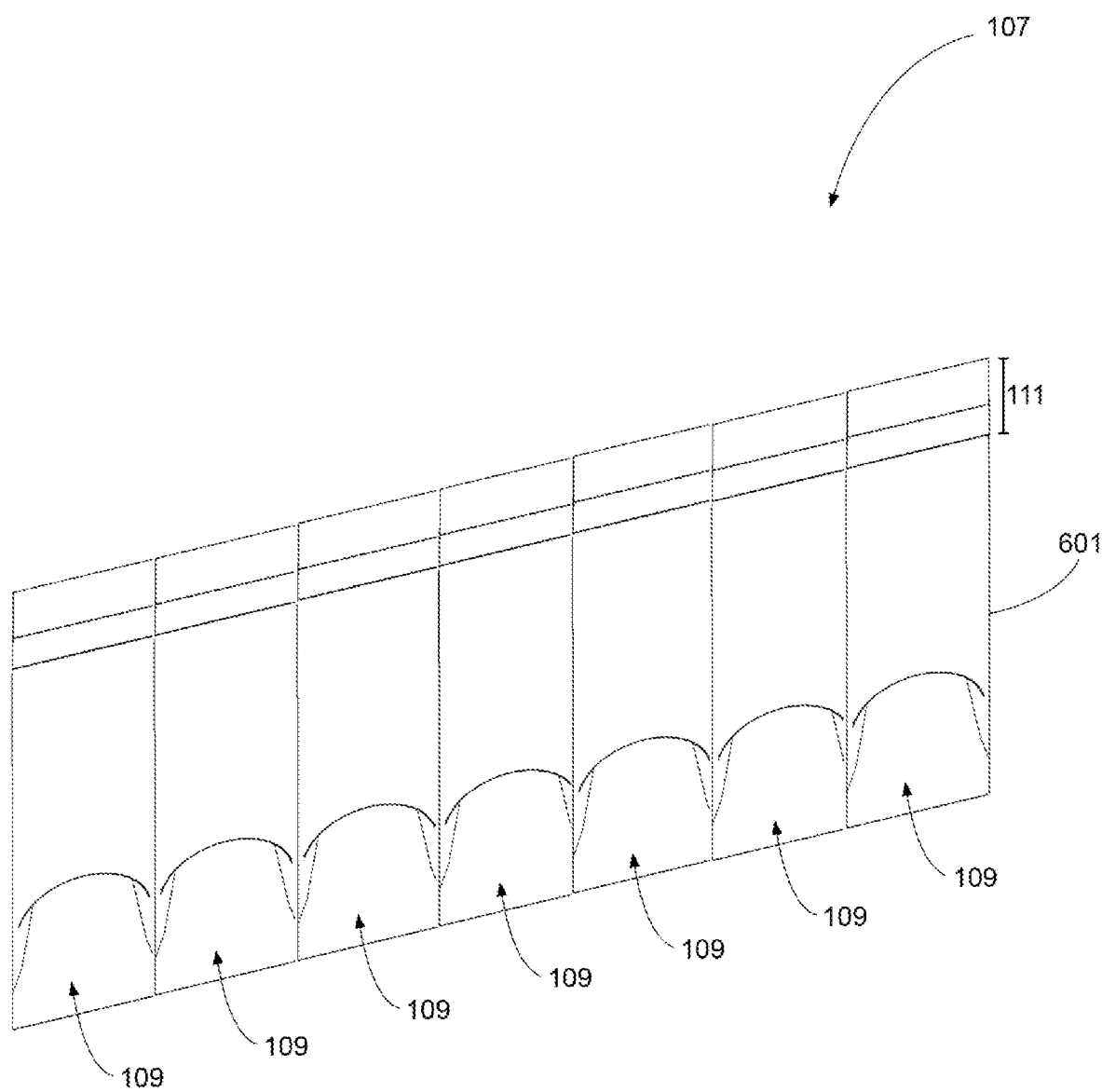
FIG. 9 shows an orthographic cutaway view of a single Bi-Wing Ducted Assembly as seen from directly above with the front at the bottom of the figure. The Flaperon Assembly is positioned for forward flight.

FIG. 9 shows an orthographic view of a single Bi-Wing Ducted Assembly 105-108 as seen from directly above. In various embodiments, the single Bi-Wing Ducted Assembly 105-108 may include several fixed Bi-Wing Duct Sections 109.

Figure 10A:
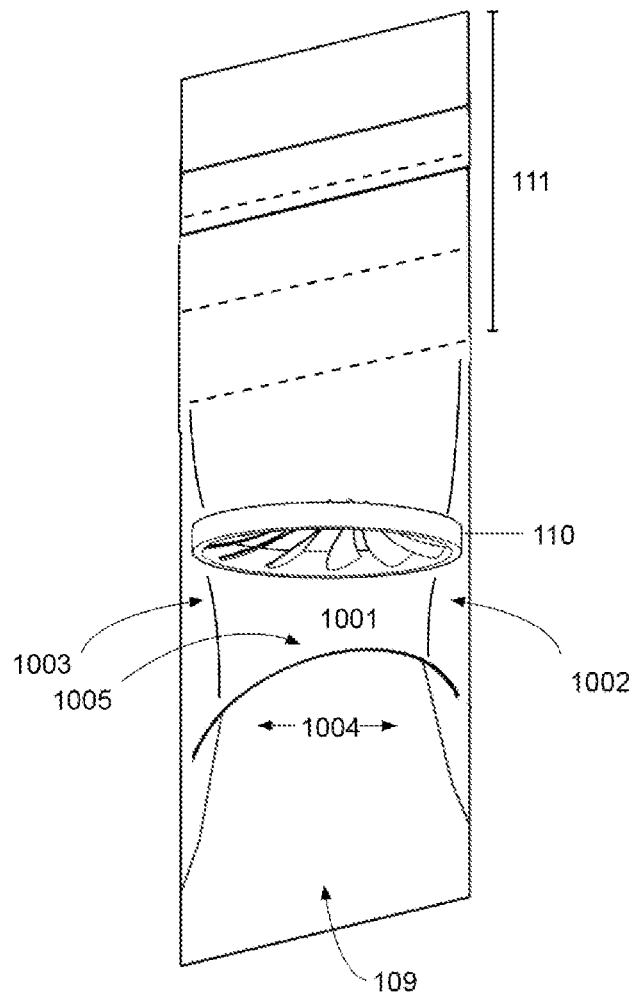
FIG. 10A shows an exemplary orthographic cutaway view as directly above a single Bi-Wing Duct Section. The Flaperon Assembly is positioned for forward flight.

FIG. 10A shows a cutaway orthographic view as directly above a single Duct Section 109. This view shows an annular duct 1001 and the left wall 1002 and right wall 1003 of the Duct Section 109. A single Rim-driven Ducted Rotor 110 is shown installed within the duct 1001. A section of the Flaperon Assembly 111 is shown truncated to the width of the Duct Section 109; the Flaperon 111 is shown in the forward flight position.

Figure 10B:
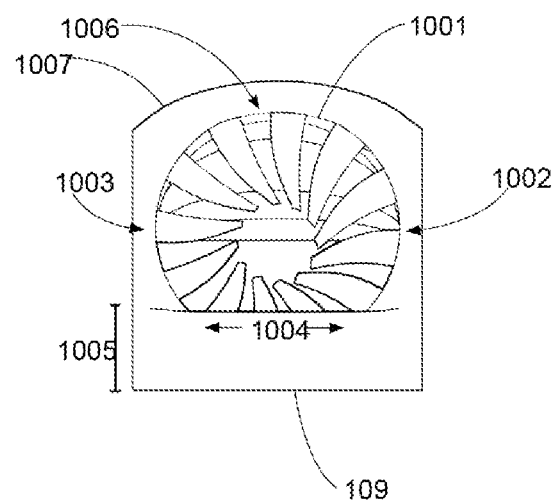
FIG. 10B shows a cutaway front view of the single Bi-Wing Duct Section 109 depicted in FIG. 10A. The Flaperon Assembly is positioned for forward flight.

FIG. 10B shows a cutaway front view of the Duct Section 109 depicted in FIG. 10A. In this view it can be seen that an annular duct 1001 is formed by the left wall 1002, the right wall 1003, a top contour 1004 of a forward lifting body 1005, and an underside 1006 of an aft lifting body 1007.

Figure 11:
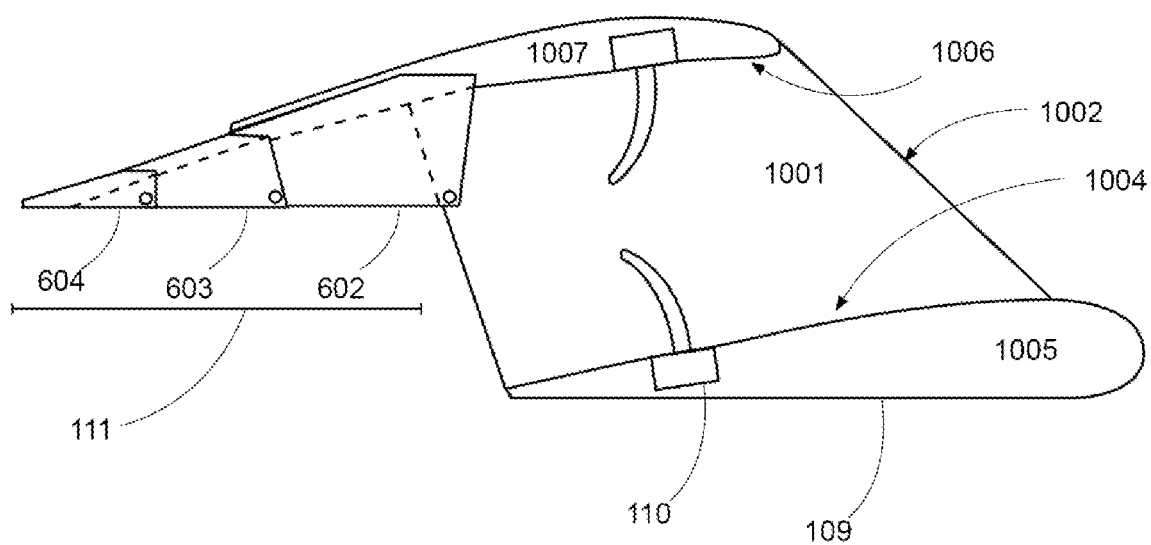
FIG. 11 shows an exemplary orthographic cutaway view as directly on the right side of a Bi-Wing Duct Section. The Flaperon Assembly is positioned for forward flight.

FIG. 11 shows an exemplary orthographic cutaway view as directly on the right side of a Duct Section 109 shown in FIG. 10B. A side cutaway of a single Rim-driven Ducted Rotor 110 is shown installed. The Flaperon Assembly 111 is shown in the forward flight position. This view shows a portion of the annular duct 1001 created by the left wall 1002, the top contour 1004 of the forward lifting body 1005, and the underside contour 1006 of the aft lifting body 1007. Attached to the trailing edge of the rear lifting body 107 is a three-segment movable Flaperon Assembly 111. The Flaperon Assembly 111 is comprised of a forward segment 602, a middle segment 603 and a back segment 604.

Figure 12:
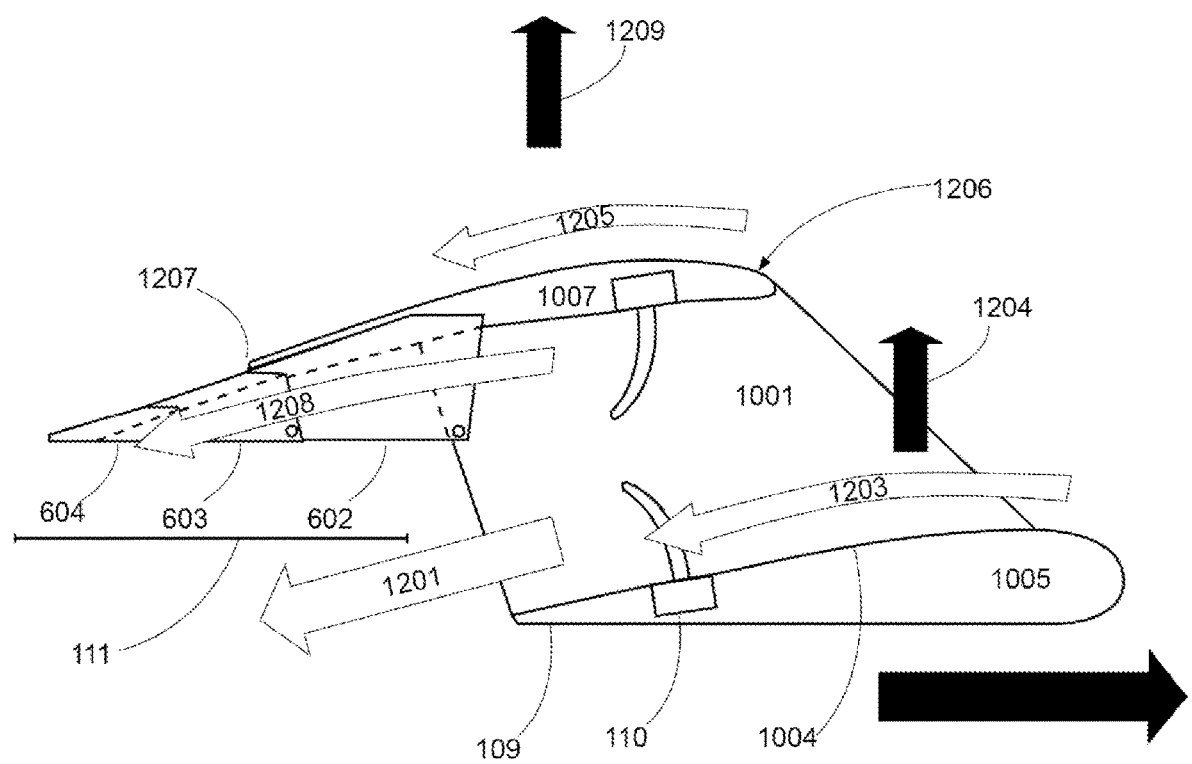
FIG. 12 shows an exemplary orthographic cutaway view and airflow diagram as directly on the right side of a Bi-Wing Duct Section. The Flaperon Assembly is positioned for forward flight.

FIG. 12 shows the same orthographic cutaway as in FIG. 11 and also showing the various air flows and forces during forward flight operation. A side cutaway of a single Rim-driven Ducted Rotor 110 is shown installed. The primary function of each Rim-driven Ducted Rotor 110 is to provide thrust 1201 to propel the Duct Section 109, and hence the aircraft 101, in the direction shown by arrow 1202. The utilization of relatively small Ducted Rotors in the aircraft 101 reduces large-scale vibrations that occur due to the rotational movement of relatively large propellers or helicopter mechanisms.

Referring to FIG. 12, the purpose of the close integration of the forward and aft lifting bodies 1005 and 1007 with the Rim-driven Ducted Rotor 110 is to increase the available thrust and lift that would otherwise be limited if the different components were installed apart from each-other, in free air, as on a different aircraft. To increase thrust 1201 of each Rim-driven Ducted Rotor 110, the cross-sectional area of the annular duct 1001, created by 1002, 1003, 1004, 1006, may be contoured, such as would a funnel of decreasing aspect angle relative to the direction of airflow; which is generally known to increase the thrust of a ducted rotor, compared to a rotor of similar disc area in free air.

To increase dynamic lift from the forward lifting body 1005, the close proximity and convex contour 1004 into the Rim-driven Ducted Rotor 110, causes an acceleration of air 1203 and an enhanced Bernoulli effect and therefore increased dynamic lift over forward lifting body 1005 shown by arrow 1204. A further advantage of the Rim-driven Ducted Rotor 110 accelerating air over lifting body 1005 is it may prevent aerodynamic stall of the wing at slow airspeeds.

Conventional dynamic lift occurs over the aft lifting body 1007 as air flows 1205 from the leading edge 1206 to where the top lifting body 1007 completes overlapping the Flaperon Assembly at location 1207. To increase lift from the aft lifting body 1007, thrust from the Rim-driven Ducted Rotor 110 is vectored through a downward channel 1208 through the Flaperon Assembly 111, which increases lift in the vector shown by arrow 1209. For example, the downward channel may be provided at approximately 20 degrees, although other angles may be suitable depending upon the design as would be apparent to one of ordinary skill.

Figure 13A:
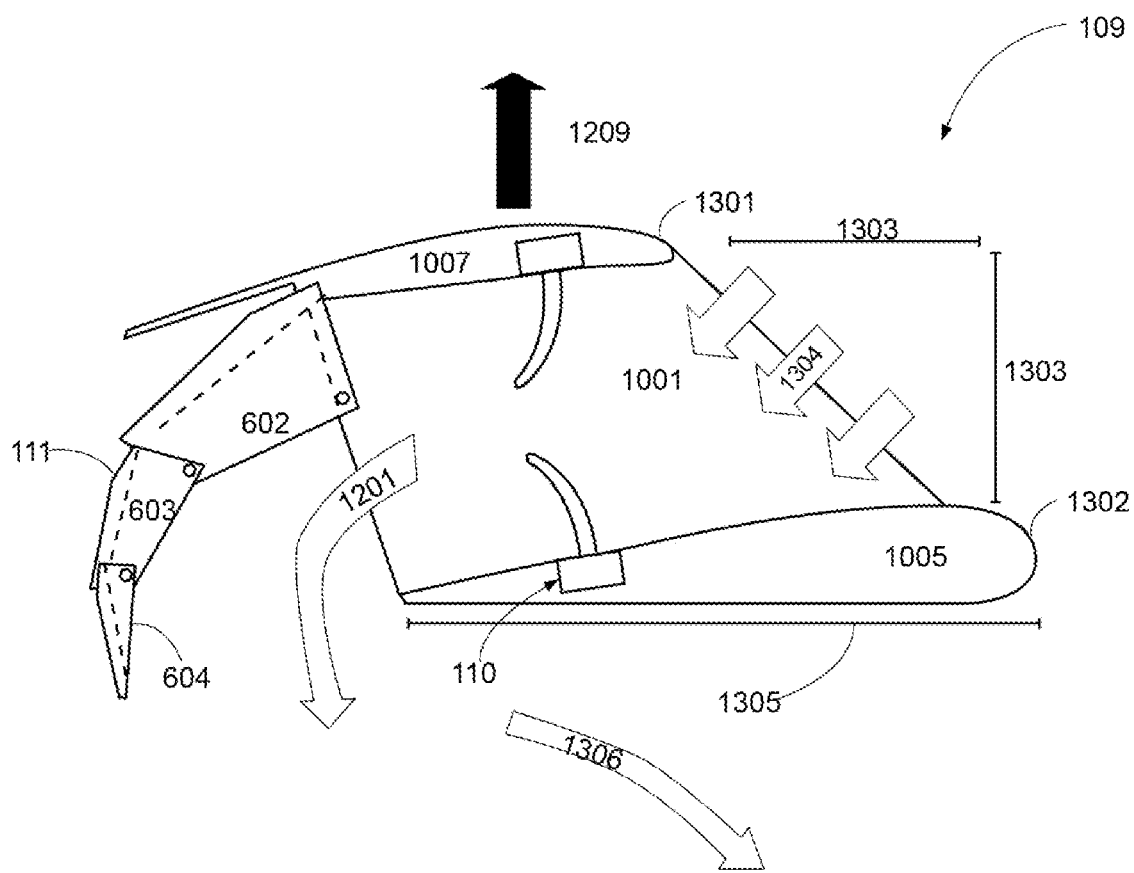
FIG. 13A shows an orthographic cutaway view as directly on the right side of a single Bi-Wing Duct Section. The Flaperon Assembly is positioned for VTOL.

FIG. 13A shows an exemplary orthographic cutaway view as directly on the right side of a Duct Section 109, configured for VTOL operation. A side cutaway of a single Rim-driven Ducted Rotor 110 is shown installed. A cutaway of a Flaperon Assembly 111 is shown positioned downward to vector thrust 1201 downward to create lift 1209 for VTOL flight.

Figure 13B:
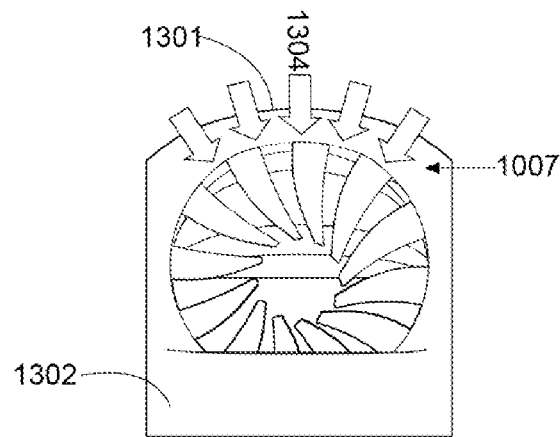
FIG. 13B shows a single Bi-Wing Duct Section as seen from the front.

FIG. 13B shows an exemplary front view of the Bi-Wing Duct Section 109 embodiment depicted in FIG. 13A. The leading edge 1301 of the aft lifting body 1007 is highly rounded around the longitudinal axis of the duct, improving airflow 1304 into the duct from across the span of lifting body 1007 during VTOL operation.

Referring to FIG. 13A, and FIG. 13B, the shape of the Bi-Wing Duct Section annular duct 1001 may be fixed, so that the shape and orientation of the inlet does not change during transition from one flight mode to another, intending to facilitate smoother, less disruptive changes in airflow from one specific lifting method to another, during flight transition—as compared to pivoting inlets that induce significant parasitic drag and turbulence during transition.

During VTOL, the primary function of the Rim-driven Ducted Rotor 110 is to generate thrust 1201 to provide high pressure air for lift 1209 of the aircraft 101, as in during take-off and landing and transition to forward flight. Just as during conventional forward flight, to increase thrust 1201 of each Rim-driven Ducted Rotor 110, the cross-sectional area of the annular duct 1001 is contoured such as would a funnel of decreasing aspect angle relative to the direction of airflow; which is generally known to increase the thrust of a ducted rotor, compared to a rotor of similar disc area in free air.

During VTOL, the Bi-Wing duct section 109 configuration of the lifting bodies 1005 and 1007 may enhance the performance of the Rim-driven Ducted Rotor 110 in at least the following ways. 1) the leading edge 1301 of the aft lifting body 1007 is located aft of the leading edge 1302 of forward lifting body 1005, at a distance 1303 roughly equal to the vertical distance that separates the two, creating a single inlet opening that is angled approximately 45 degrees upward. Compared to inlets that only face forward, the upward angle of the inlet ensures a greater proportion of air 1304 is drawn from above the aircraft 101 instead of in front of it, improving efficiency and controllability compared to forward facing inlets. Compared to inlets that face only upward, the angle makes the inlets less susceptible to loss of thrust during gusty conditions. Also compared to inlets that face only upward, the angle the aircraft is more controllable in in high wind landing conditions because the aircraft and rotors can be positioned to face into the prevailing wind direction, which is generally known to improve the lift and controllability of a hovering aircraft. 2) The fixed chord of the lower lifting body 1005 extends well forward of where the thrust escapes the Flaperon 111, ensuring high-pressure exhaust air will remain substantially below the wing, and therefore enhance lift of the wing 1306, instead of being vacuumed back into the inlet.

Referring to FIG. 13A, the Flaperon Assembly 111 provides the primary way for thrust to be vectored perpendicular to the ground for VTOL flight. The utilization of lightweight Flaperons instead of pivoting wings or pivoting rotor housings, reduces the amount of rotational momentum and gyroscopic effects that would otherwise need to be compensated during transition. The front 602, middle 603 and rear 604 Flaperon Segments may each be pivoted, in unison, up to 35 degrees each, resulting in a downward direction of the entire assembly. The downward direction of the entire assembly causes thrust being vectored perpendicular to the ground, creating lift of the aircraft. An embodiment of a Flaperon Assembly may be comprised of only two Flaperon Segments, 602 and 603, which will function substantially the same as a Flaperon Assembly comprised of 3 Flaperon Segments. Actuation of the Flaperon Assembly 111 does not significantly increase frontal area of the aircraft, so smoother aerodynamic transitions from VTOL to horizontal flight are possible compared to aircraft with tilting wings or partially tilting wings, which must present 50%-100% of total wing area perpendicular to direction of flight during transition. The smoother transitions reduce parasitic drag and turbulence during transition, which improves the performance of the aircraft.

Figure 14:
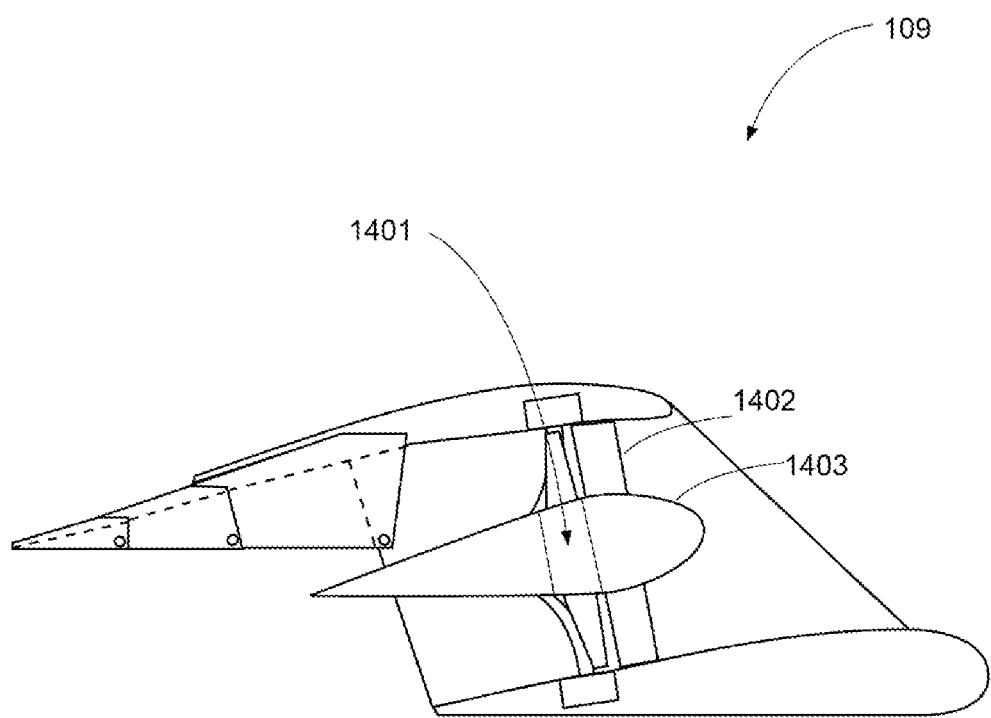
FIG. 14 shows an orthographic cutaway view a single Bi-Wing Duct Section with an alternative embodiment Axial-Driven Ducted Rotor located at centerline. The Flaperon Assembly is positioned for forward flight.

FIG. 14 shows an orthographic cutaway view on the center line of a single Bi-Wing duct section 109 with an Axial Driven Ducted Rotor 1401 with fixed stators to position the Axial Driven Ducted Rotor 1402, and central electrical drive motor 1403. Although the present invention has been illustrated and described herein with reference to embodiment and specific example of rim-driven Ducted Rotors, it will be readily apparent to those of ordinary skill in the art that Axial Driven Ducted Rotor 1401 embodiments and examples may perform similar functions and/or achieve like results.

Figure 15:
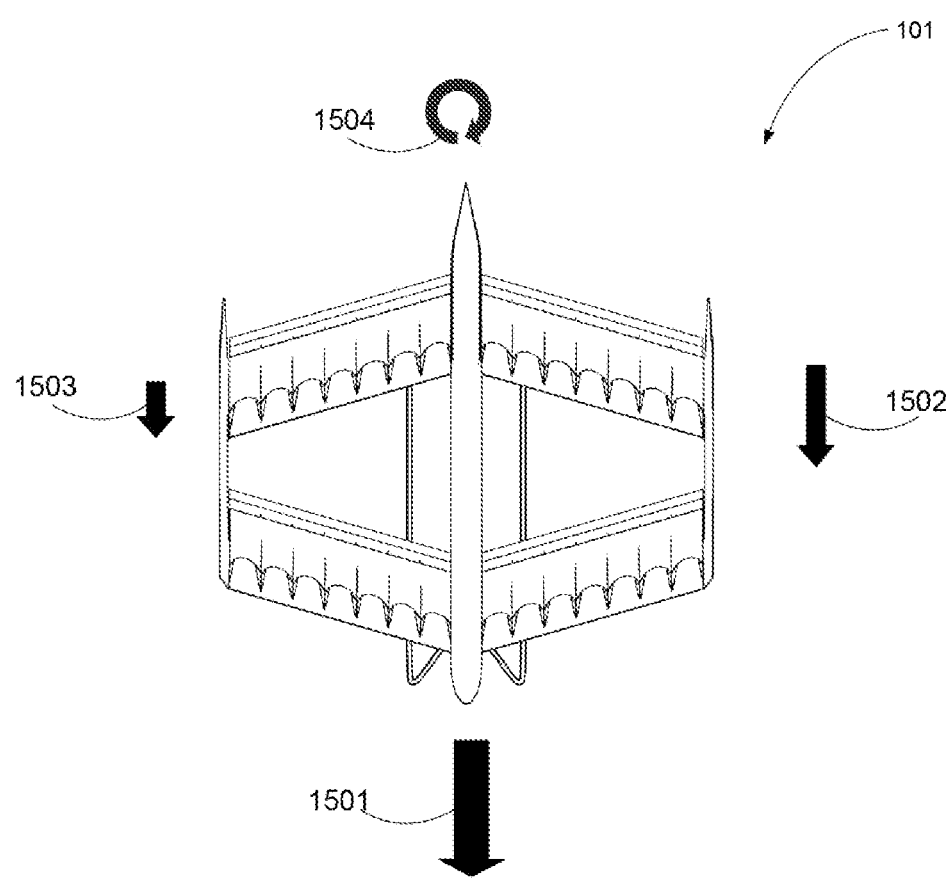
FIG. 15 shows an orthographic view as directly above a complete aircraft embodiment, in forward flight, with the front at the bottom of the figure
Figure 16:
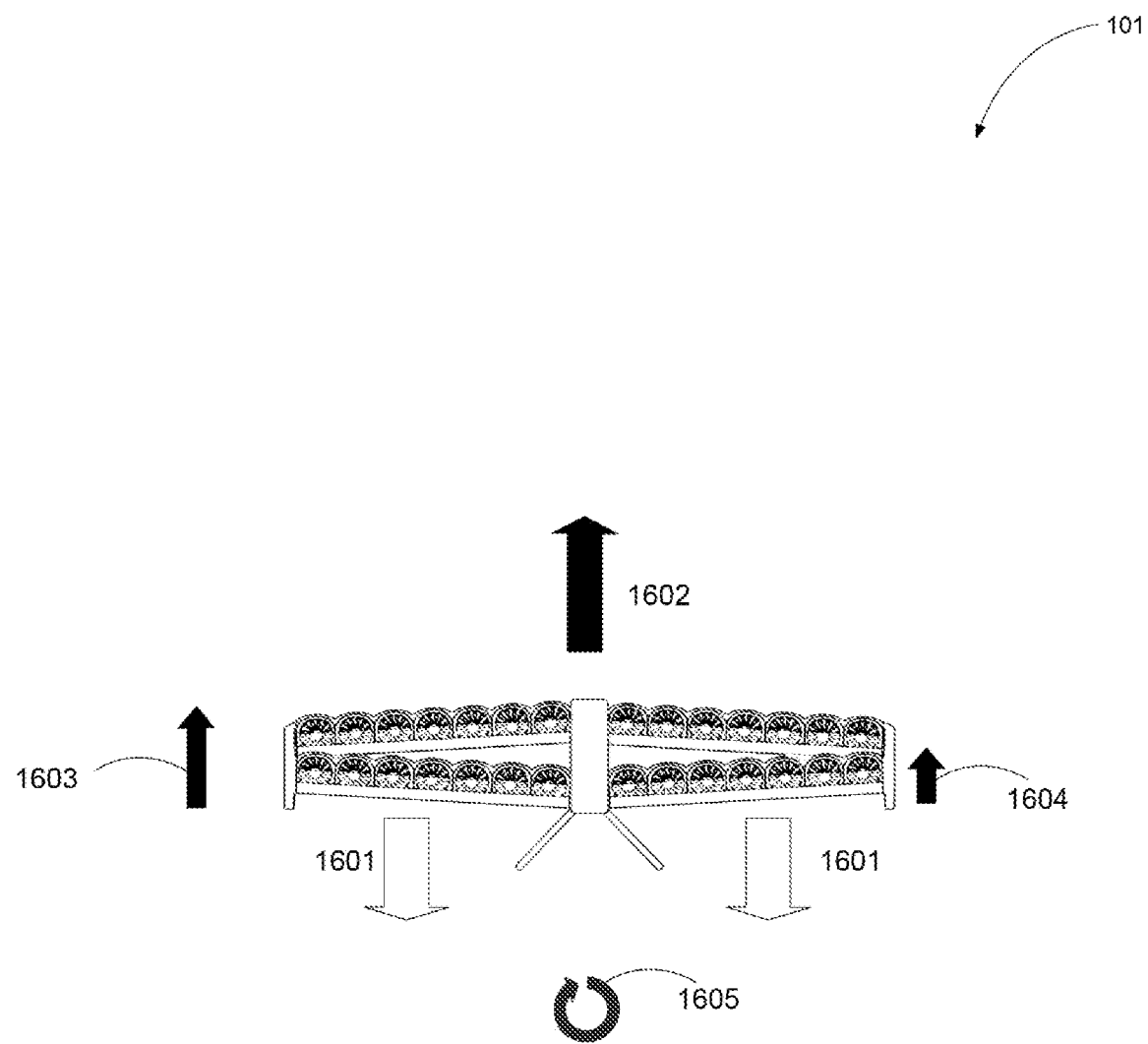
FIG. 16 shows an orthographic view as directly in front of a complete aircraft embodiment in VTOL flight.
Figure 17:
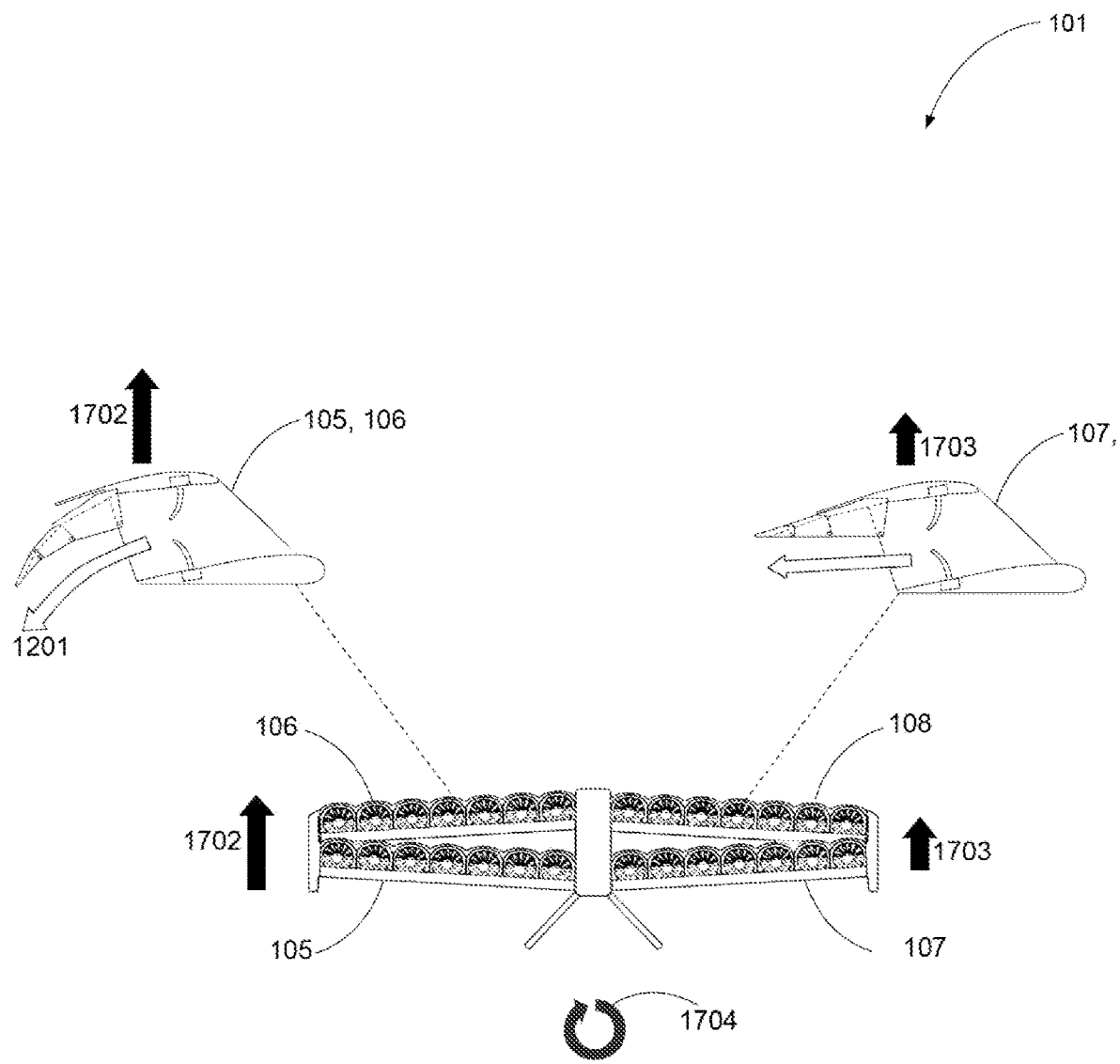
FIG. 17 shows an orthographic view as directly in front of a complete aircraft embodiment, in forward flight, as well as two cutaway views of a Bi-Wing Duct Section as seen directly from the right.

FIG. 15-17 show how a flight control system coordinates and individually activates each Rim-driven Ducted Rotor 110 and Flaperon assembly 111, to control various embodiments. This description does not describe every aspect of the control system, or possible combinations or techniques applied to other embodiments.

FIG. 15 is an exemplary diagram about controlling yaw with differential thrust in forward flight. In forward flight, the primary purpose of the Rim-driven Ducted Rotors 110 is to produce thrust to propel the entire aircraft 101 in the forward direction 1501. During forward flight, the Rim-driven Ducted Rotors 110 are individually throttleable to assist control primarily in the yaw axis of the entire aircraft by applying differential thrust—creating more thrust on the left side of the aircraft 1502 and less on the right side 1503, in order to create a clockwise yaw moment 1504 or vice versa for counter-clockwise yaw.

FIG. 16 is an exemplary diagram about controlling roll with differential thrust in VTOL flight. In VTOL flight, the primary purpose of the Rim-driven Ducted Rotors 110 is to produce thrust 1601 which is directed perpendicular to the ground to produce lift 1602. For roll controllability in VTOL, applying more thrust on the right side of the aircraft 1603 and less on the left side 1604, causes a counterclockwise roll moment 1605 or vice versa for clockwise roll.

FIG. 17 is an exemplary diagram about controlling roll in forward flight by actuating Flaperon Assemblies 111. The small mass of each Flaperon Assembly 111 segment, as compared to bulkier tilting wings or tilting rotor housings, enables their use as a precise control mechanism. The Flaperon Assemblies 111 also do not convey significant gyroscopic effects that tilting rotors or propellers exhibit when used as control devices. Each Flaperon Assembly 111 may be individually actuated, causing differential forces to assist controlling, such as the pitch and roll axis of the entire aircraft 101. For example, actuating the Flaperon Assembly 111 on Bi-Wing Ducted Assemblies 105 and 106, vectors thrust downward 1201, increasing lift on the right side 1702 of the aircraft compared to the left side 1703, which will cause a clockwise roll moment 1704 or vice versa for counter-clockwise roll.

Figure 18A:
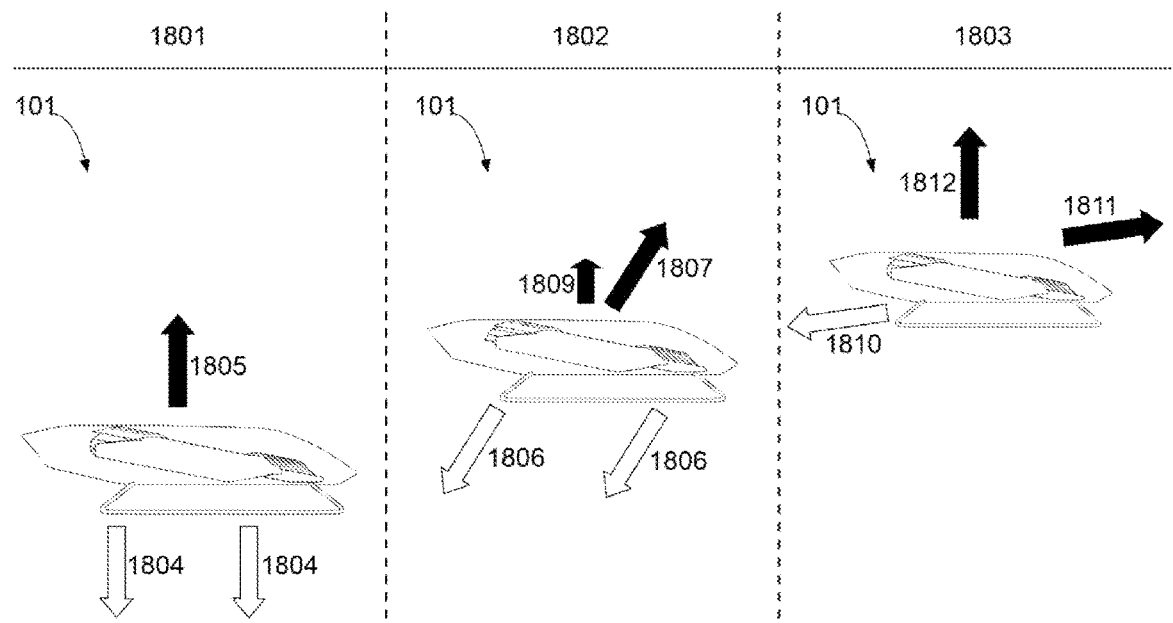
FIG. 18A shows an orthographic diagram as directly to the right side a complete aircraft embodiment transitioning from VTOL flight to forward flight.
Figure 18B:
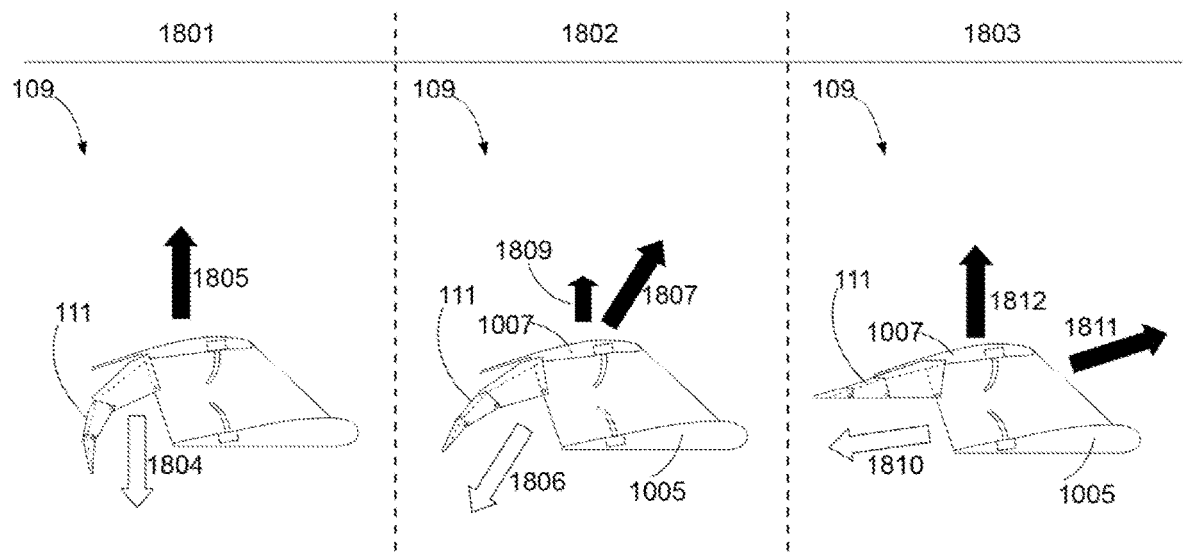
FIG. 18B shows an orthographic diagram as directly to the right side an embodiment single cutaway Bi-Wing Duct Section transitioning from VTOL flight to forward flight

FIG. 18 is an exemplary diagram about transitioning from a hover to forward flight, as in a VTOL procedure. During hovering flight 1801, the Flaperon Assemblies 111 are fully actuated to direct thrust 1804 perpendicular to the ground to cause lift 1805 of the entire aircraft 101. To change from hovering flight 1801 to transitional flight 1802 to forward flight 1803, the Flaperon Assemblies 111 are actuated to direct thrust partially perpendicular to the ground and partially to the rear 1806 to cause motion that is upward as well as forward 1807. At sufficient airspeed, the lifting bodies 1005, 1007 of the wing start producing dynamic lift 1809, and more of the thrust can be directed to propel the aircraft forward. In forward flight 1803, the Flaperon span assemblies 111 direct thrust 1810 mostly to the rear to propel the aircraft 101 forward. At sufficient forward airspeed, the lifting bodies 1005, 1007 of the wings are generating most of the necessary lift for flight by dynamic lift.

Figure 19:
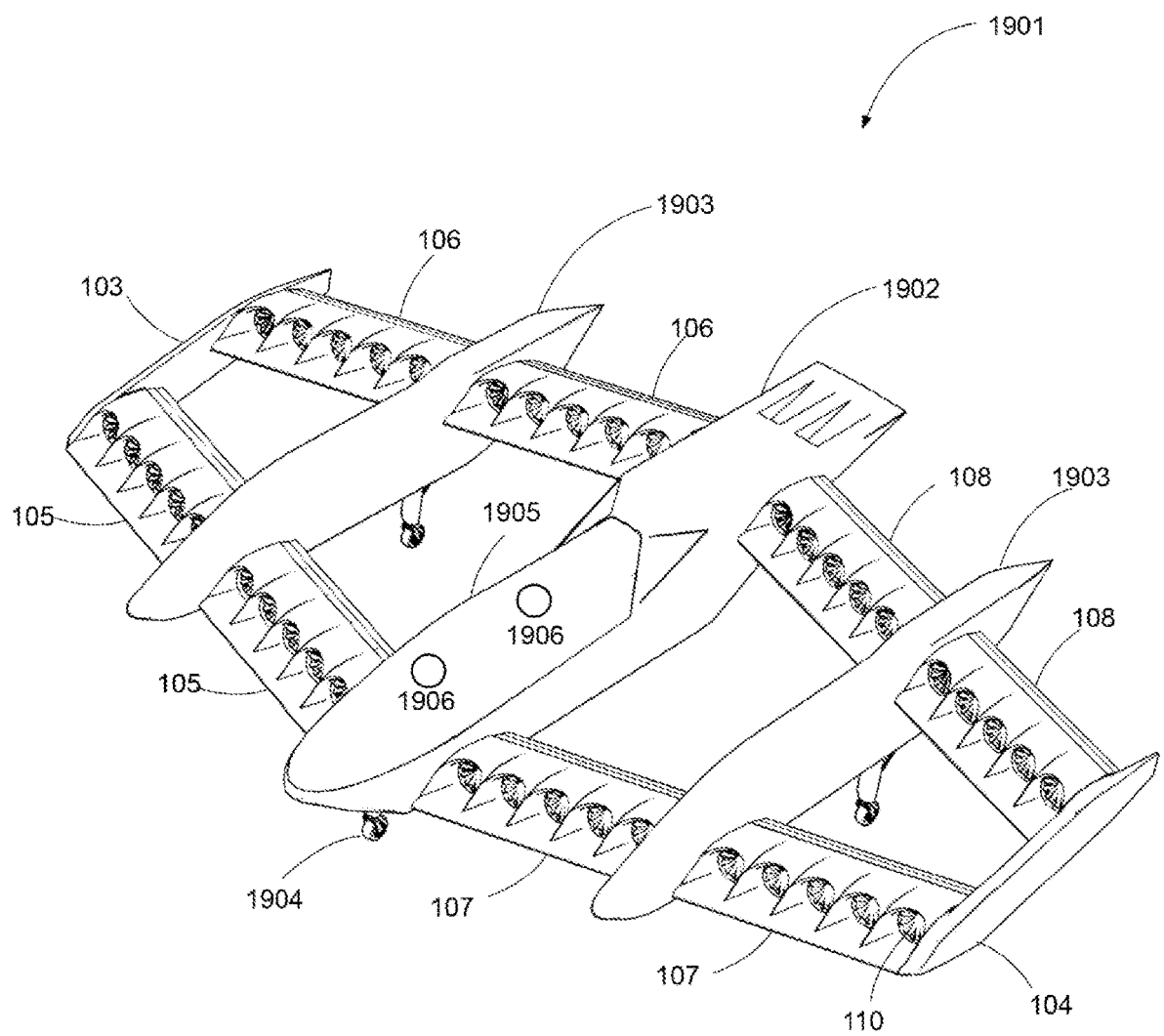
FIG. 19 shows a perspective view example of another embodiment aircraft.
Figure 20:
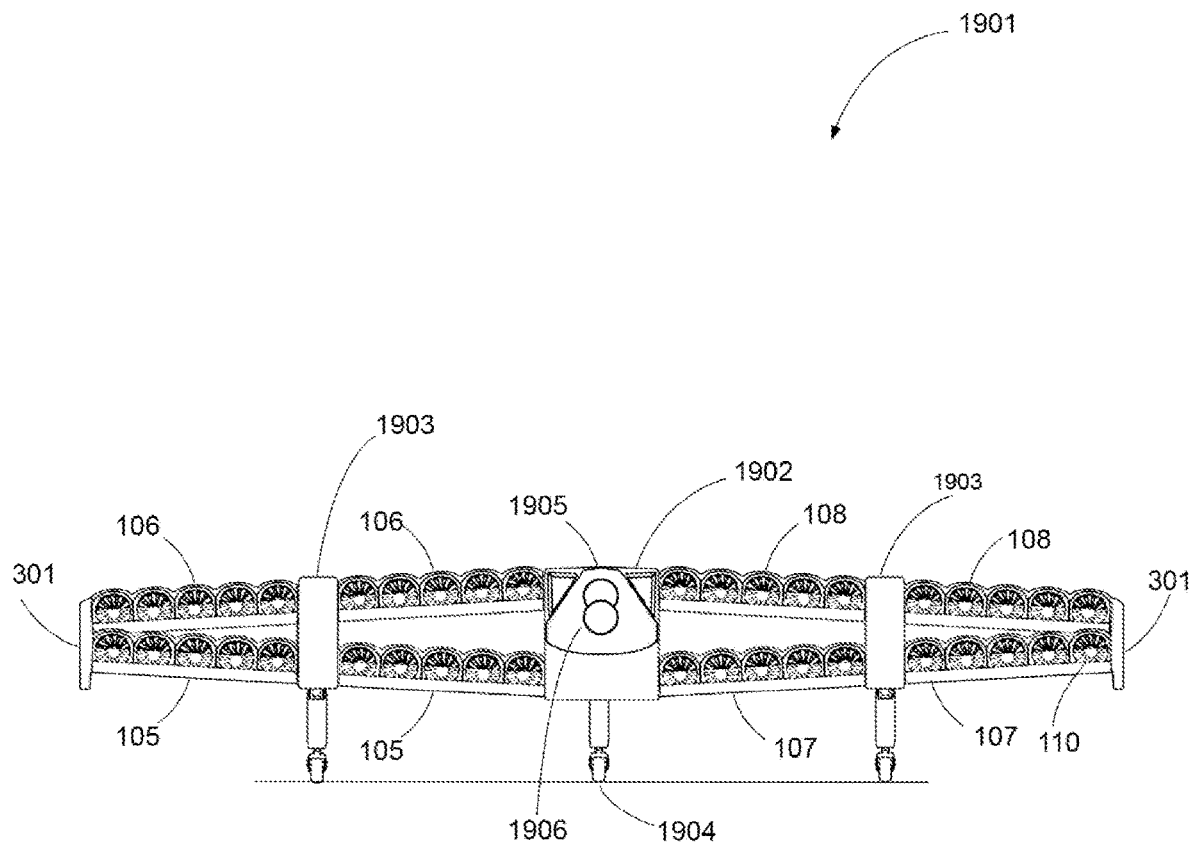
FIG. 20 shows an orthographic view as seen from the front of the embodiment aircraft shown in FIG. 19, with the front at the bottom of the figure
Figure 21:
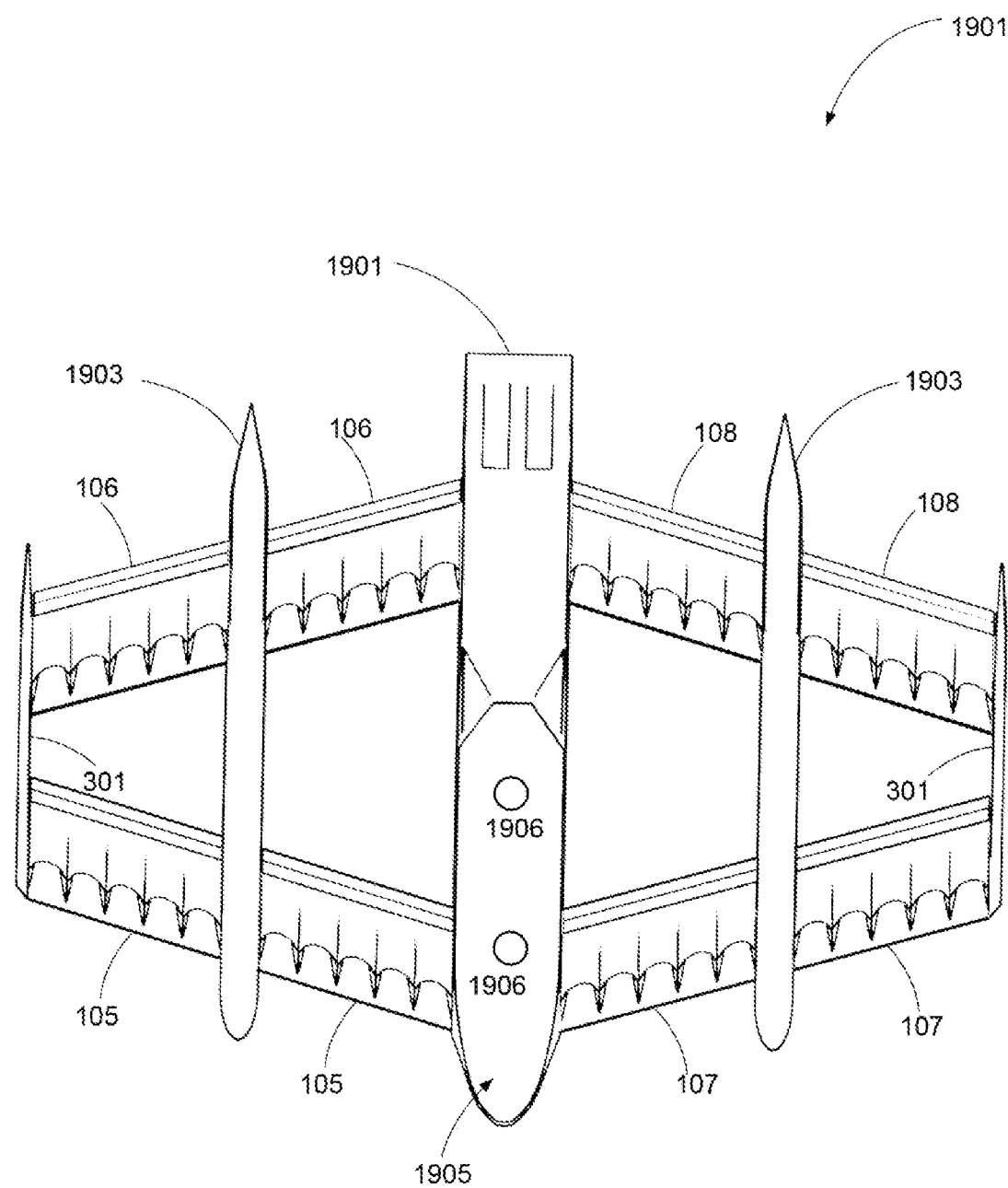
FIG. 21 shows an orthographic view as seen from above of the embodiment aircraft shown in FIG. 19.

FIGS. 19-21 show various views of embodiments of the aircraft 1901 that has 40 Rim-driven Ducted Rotors 110 distributed and installed within eight separate Bi-Wing Ducted Assemblies 105, 106, 107, 108— which in turn are assembled as one RH Box Wing Assembly 103 and one LH Box Wing Assembly 104. FIGS. 19-21 also depict a central fuselage 1902 and mid-wing fuselage sections 1903 that may contain electrical power-generation and or storage system components. Possible system embodiments may include but are not restricted to one or many hydrocarbon burning turbines producing electricity; batteries; hydrogen-based fuel-cells. Wheeled landing gear 1904 may be employed to enable conventional take-off and landing. A removable canopy 1905 and multiple seating positions 1906 for the possibility of human occupation and/or operation of the aircraft 101 may also be included.

Figure 22:
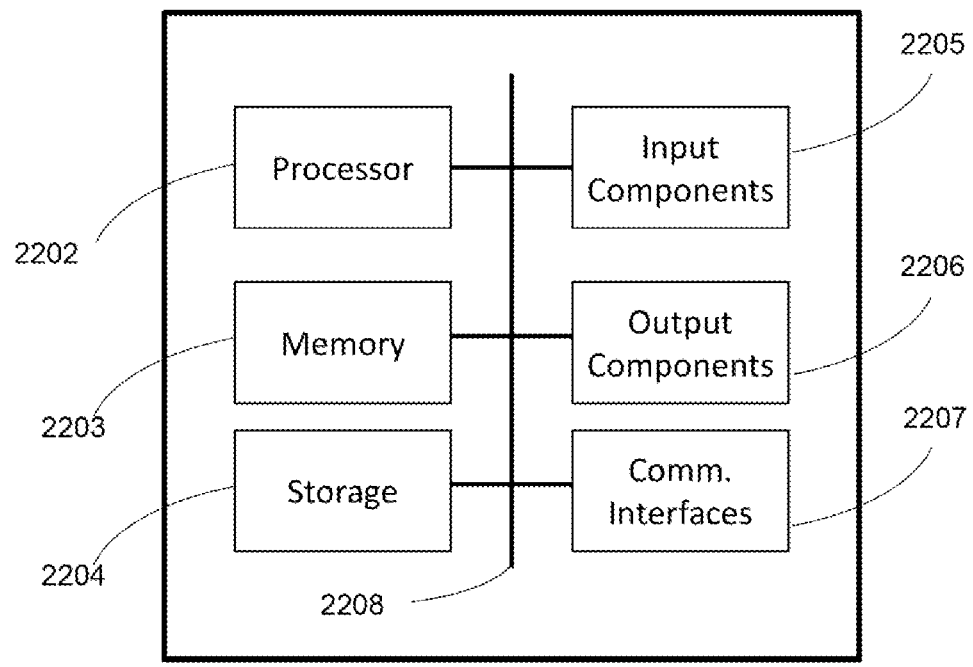
FIG. 22 depicts exemplary computing resources that may be employed in various aircraft embodiments.

FIG. 22 illustrates exemplary component embodiments of various computing resources 18 that may be employed in the aircraft 101 to control operations, communications, etc. The computing resources 18 may each include one or more processors 2202, memory 2203, storage 2204, input components 2205, output components 2206, communication interfaces 2207, as well as other components that may be interconnected as desired by the skilled artisan via one or more buses 2208. As previously described, the components of the various computing resources 2201 may often be configured as a single device or multiple interdependent or stand-alone devices in close proximity and/or distributed throughout the aircraft 101.

Processor(s) 2202 may include one or more general or Central Processing Units ("CPU"), Graphics Processing Units ("GPU"), Accelerated Processing Units ("APU"), microprocessors, and/or any processing components, such as a Field-Programmable Gate Arrays ("FPGA"), Application-Specific Integrated Circuits ("ASIC"), etc. that interpret and/or execute logical functions. The processors 2202 may contain cache memory units for temporary local storage of instructions, data, or computer addresses and may be implemented as a single-chip, multiple chips and/or other electrical components including one or more integrated circuits and printed circuit boards that implements and executes logic in hardware, in addition to executing software.

Processor(s) 2202 may connect to other computer systems and/or to telecommunications networks as part of performing one or more steps of one or more processes described or illustrated herein, according to particular needs. Moreover, one or more steps of one or more processes described or illustrated herein may execute solely at the processor 2202. In addition, or as an alternative, one or more steps of one or more processes described or illustrated herein for execution in one processor may be executed at multiple CPUs that are local or remote from each other across one or more networks.

The computing resources 2201 may implement processes employing hardware and/or software to provide functionality via hardwired logic or otherwise embodied in circuits, such as integrated circuits, which may operate in place of or together with software to execute one or more processes or one or more steps of one or more processes described or illustrated herein. Software implementing particular embodiments may be written in any suitable programming language (e.g., procedural, object oriented, etc.) or combination of programming languages, where appropriate.

The computing resources 2201 may implement processes employing software to provide an embodiment of artificial intelligence, which may operate in place of or together with software to store experiential data from the Input Components 2205, independently process the data in the processor 2202, and use the results to improve performance against human provided criteria for performance. Improved performance may be conveyed though Output Components 2206 and evident in embodiments such as the efficiency of the propulsion system, in the reaction time of the flight controls, the reliability of the communications interfaces, or safe interactivity with other nearby objects or aircrafts.

Memory 2203 may include Random Access Memory ("RAM"), Read Only Memory ("ROM"), and/or another type of dynamic or static storage device, such as flash, magnetic, and optical memory, etc. that stores information and/or instructions for use by processor 2202. The memory 2203 may include one or more memory cards that may be loaded on a temporary or permanent basis. Memory 2203 and storage 2204 may include a Subscriber Identification Module ("SIM") card and reader.

Storage components 2204 may store information, instructions, and/or software related to the operation of the aircraft 101 and computing resources 2201. Storage 2204 may be used to store operating system, executables, data, applications, and the like, and may include fast access primary storage, as well as slower access secondary storage, which may be virtual or fixed.

Storage component(s) 2204 may include one or more transitory and/or non-transitory computer-readable media that store or otherwise embody software instructions, etc. implementing particular embodiments. The computer-readable medium may be any tangible medium capable of carrying, communicating, containing, holding, maintaining, propagating, retaining, storing, transmitting, transporting, or otherwise embodying software, where appropriate, including nano-scale medium. The computer-readable medium may be a biological, chemical, electronic, electromagnetic, infrared, magnetic, optical, quantum, or other suitable medium or a combination of two or more such media, where appropriate. Example computer-readable media include, but are not limited to fixed and removable drives, ASIC, Compact Disks ("CDs"), Digital Video Disks ("DVDs", FPGAs, floppy disks, optical and magneto-optic disks, hard disks, holographic storage devices, magnetic tape, caches, Programmable Logic Devices ("PLDs"), RAM devices, ROM devices, semiconductor memory devices, solid state drives, cartridges, and other suitable computer-readable media.

Input components 2205 and output components 2206 may include various types of Input/Output ("I/O") devices. The I/O devices often may include a Graphical User Interface ("GUI") that provides an easy to use visual interface between the operator(s) and the aircraft 101 and access to the operating system or application(s) running on the aircraft 101 and/or aircraft control systems external to the aircraft 101.

Input components 2205 receive any type of input in various forms from users or other machines, such as touch screen and video displays, keyboards, keypads, mice, buttons, track balls, switches, joy sticks, directional pads, microphones, cameras, transducers, card readers, voice and handwriting inputs, and sensors for sensing information such as biometrics, temperature, other aircraft & other environmental conditions, such as air quality, etc., location via Global Positioning System ("GPS") or otherwise, accelerometer, gyroscope, compass, actuator data, which may be input via a user or received via one or more communication interfaces 2207.

Output component 2206 may include displays, speakers, lights, sensor information, mechanical, or other electromagnetic output. Similar to the input, the output may be provided via one or more ports and/or one or more communication interfaces 2207.

Communication interface 2207 may include one or more transceivers, receivers, transmitters, modulators, demodulators that enable communication, via wired and/or wireless connections onboard and remote from the aircraft 101. Communication interfaces 2207 may include Ethernet, optical, coaxial, Universal Serial Bus ("USB"), Infrared ("IR"), Radio Frequency ("RF") including the various Wi-Fi, WiMax, cellular, and Bluetooth protocols, such as Bluetooth, Bluetooth Low Energy (BLE), Wi-Fi (IEEE 802.11), Wi-Fi Direct, SuperWiFi, 802.15.4, WiMax, LTE systems, LTE Direct, past, current, and future cellular standard protocols, e.g., 4-5G, Satellite or other wireless signal protocols or technologies as described herein and known in the art.

Bus(es) 2208 may connect a wide variety of other subsystems, in addition to those depicted, and may include various other components that permit communication among the components in the computing resources 2201. The bus(es) 2208 may encompass one or more digital signal lines serving a common function, where appropriate, and various structures including memory, peripheral, or local buses using a variety of bus architectures. As an example and not by way of limitation, such architectures include an Industry Standard Architecture ("ISA") bus, an Enhanced ISA ("EISA") bus, a Micro Channel Architecture ("MCA") bus, a Video Electronics Standards Association Local Bus ("VLB"), a Peripheral Component Interconnect ("PCI") bus, a PCI-eXtended ("PCI-X") bus, a Peripheral Component Interconnect Express (PCIe) bus, a Controller Area Network ("CAN") bus, and an Accelerated Graphics Port ("AGP") bus.

The computing resources 2201 may provide functionality as a result of the processors 2202 executing software embodied in one or more computer-readable storage media residing in the memory 2203 and/or storage 2204 and logic implemented and executed in hardware. The results of executing the software and logic may be stored in the memory 2203 and/or storage 2204, provided to output components 2206, and transmitted to other devices via communication interfaces 2207, which includes cloud storage and cloud computing. In execution, the processor 2202 may use various inputs received from the input components 2205 and/or the communications interfaces 2207. The input may be provided directly to the processor 2202 via the bus 2208 and/or stored before being provided to the processor 2202. Executing software may involve carrying out processes or steps may include defining data structures stored in memory 2203 and modifying the data structures as directed by the software.

It is to be understood that the foregoing embodiments are exemplary, and that the technology is NOT limited to only the embodiment or scale disclosed herein. Equivalent variations not hitherto disclosed are to be under-stood as remaining within the scope and the spirit of the claims below Although the present invention has been illustrated and described herein with reference to embodiment and specific example thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An aircraft comprising:
   a fuselage having a forward and aft direction and including a power system;
   a first right and second wing attached to the fuselage,
     the second right wing being attached elevationally above and aft of the first right wing, and
     the first and second right wings each having wingtips and being physically connected proximate the wingtips by at least one wingtip longitudinal structure;
   a first and second left wing attached to the fuselage at least substantially symmetrically opposed to the corresponding first and second right wings,
     the second left wing being attached elevationally above and aft of the first left wing
     the first and second left wings each having wingtips and being physically connected proximate the wingtips by at least one wingtip longitudinal structure;
   the first and second right wing and first and second left wing including at least one ducted assembly including a fixedly positioned rotor to draw air from the forward direction through the ducted assembly and propel air out of the ducted assembly in the aft direction when powered, the rotor employing power from the power system to rotate, and a segmented moveable flaperon assembly positioned in the aft direction relative to the rotor to direct propelled air to provide substantially forward thrust and vertical dynamic lift in a first position and substantially vertical thrust and vertical lift in a second position.

2. The aircraft of claim 1, further comprising: at least one processor to control the rotation of the rotors and the movement of the flaperons to enable flight of the aircraft.

3. The aircraft of claim 2, where the processor communicates with at least one control device to communicate instructions and data.

4. The aircraft of claim 1, where the ducted assemblies include forward and aft lifting bodies separated by a vertical distance and a forward to aft distance.

5. The aircraft of claim 4, where the forward to aft distance is at least half of the vertical distance between the lifting bodies.

6. The aircraft of claim 1, where the power system is an electrical power system, and the rotors are electrically power rotor driven by power from the electrical power system.

7. The aircraft of claim 6, where
the electrical power system includes at least one of a battery and a hydrocarbon-fueled power generator.

8. The aircraft of claim 1, where
the first right and left wings and attached flaperons are constructed primarily from at least one of carbon fiber composite material.

9. The aircraft of claim 1, where
the first right and left wings each include at least three ducted assemblies.

10. The aircraft of claim 1, where
the first right and left wings include less than twenty ducted assemblies.

11. The aircraft of claim 1, where
the rotors are positioned at a non-zero angle relative to horizontal in the forward-aft direction.

12. The aircraft of claim 11, where
the rotors are positioned at a 45 degree angle relative to horizontal in the forward-aft direction.

13. The aircraft of claim 1, further comprising:
one of landing skids and landing gear to support runway take-off and landing.

14. An aircraft comprising:
a fuselage having a forward and aft direction and including an electrical power system;
a forward and an aft right wing attached to the fuselage, the aft right wing being attached elevationally above and aft of the forward right wing,
the forward and aft right wing having wingtips and being physically connect proximate the wingtips by a wingtip longitudinal structure;
a forward and an aft left wing attached to the fuselage, the aft left wing being attached elevationally above and aft of the forward left wing,
the forward and aft left wing having wingtips and being physically connect at the wingtips by a wingtip longitudinal structure;
the forward and aft right wings and the forward and aft left wings including
a plurality of ducted assemblies, each including a fixedly positioned electrical rotor to draw air from the forward direction through the ducted assembly and propel air out of the ducted assembly in the aft direction when powered by the electrical power system,
the rotors and power system being sized to enable vertical take-off, forward flight, and vertical landing of the aircraft, and
a segmented moveable flaperon assembly positioned in the aft direction relative to the rotor to direct propelled air to provide substantially forward thrust and dynamic lift in a first position and substantially vertical thrust and vertical lift in a second position.

15. The aircraft of claim 14, where
the first and second right and left wings each include at least three ducted assemblies.

16. The aircraft of claim 14, where
the fuselage is configured to carry at least one person.

17. The aircraft of claim 14, where
the rotors are positioned at a non-zero angle relative to horizontal in the forward-aft direction.

18. A method of controlling an aircraft comprising:
providing an aircraft having
a fuselage having a forward and aft direction and including a power system,
at least a first and second right wing attached to the fuselage,
the second right wing being attached elevationally above and aft of the first right wing, and
the first and second right wings each having wingtips and being physically connected proximate the wingtips by at least one wingtip longitudinal structure;
at least a first and second left wing attached to the fuselage at least substantially symmetrically opposed to the corresponding first and second right wings,
the second left wing being attached elevationally above and aft of the first left wing
the first and second left wings each having wingtips and being physically connected proximate the wingtips by at least one wingtip longitudinal structure;
the first and second right wings and first and second left wings including at least one ducted assembly including a fixedly positioned rotor, and
a segmented moveable flaperon assembly positioned in the aft direction relative to the rotor; and
powering the rotors via the power system to draw air from the forward direction through the ducted assembly and propel air out of the ducted assembly in the aft direction;
positioning the moveable flaperon in a first position to direct propelled air from the rotor to provide substantially forward thrust and dynamic lift in a first position and in a second position to provide substantially vertical thrust and vertical lift.

\* \* \* \* \*